(12) United States Patent
Stockman

(10) Patent No.: US 11,581,149 B1
(45) Date of Patent: *Feb. 14, 2023

(54) CAPACITOR FOR MULTIPLE REPLACEMENT APPLICATIONS

(71) Applicant: AmRad Manufacturing, LLC, Universal City, TX (US)

(72) Inventor: Robert M. Stockman, Palm Coast, FL (US)

(73) Assignee: AmRad Manufacturing, LLC, Universal City, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,017

(22) Filed: Nov. 12, 2021

Related U.S. Application Data

(63) Continuation of application No. 16/678,500, filed on Nov. 8, 2019, now Pat. No. 11,177,074, which is a continuation of application No. 16/195,077, filed on Nov. 19, 2018, now Pat. No. 10,497,520, which is a continuation of application No. 15/585,782, filed on
(Continued)

(51) Int. Cl.
| | |
|---|---|
| *H01G 4/38* | (2006.01) |
| *H01G 2/24* | (2006.01) |
| *H01G 4/232* | (2006.01) |
| *H01G 4/236* | (2006.01) |
| *H01G 2/14* | (2006.01) |
| *H01G 4/32* | (2006.01) |

(Continued)

(52) U.S. Cl.
CPC ............... *H01G 4/385* (2013.01); *H01G 2/14* (2013.01); *H01G 2/24* (2013.01); *H01G 4/224* (2013.01); *H01G 4/228* (2013.01); *H01G 4/232* (2013.01); *H01G 4/236* (2013.01); *H01G 4/32* (2013.01); *H01G 4/38* (2013.01)

(58) Field of Classification Search
None
See application file for complete search history.

(56) References Cited

U.S. PATENT DOCUMENTS

| | | | |
|---|---|---|---|
| 1,665,499 | A | 4/1928 | Hoch |
| 1,707,959 | A | 4/1929 | Fried |

(Continued)

FOREIGN PATENT DOCUMENTS

| | | |
|---|---|---|
| CA | 2285721 | 4/2000 |
| CN | 2033169 | 2/1989 |

(Continued)

OTHER PUBLICATIONS

US 10,504,654 B2, 12/2019, Stockman (withdrawn)
(Continued)

*Primary Examiner* — Dion R. Ferguson
(74) *Attorney, Agent, or Firm* — Fish & Richardson P.C.

(57) ABSTRACT

An apparatus suitable for use in an air-conditioning system and configured to provide a plurality of selectable capacitance values includes a plurality of capacitive devices and a pressure interrupter cover assembly. Each of the capacitive devices has a first capacitor terminal and a second capacitor terminal. The pressure interrupter cover assembly includes a deformable cover, a set of capacitor cover terminals, a common cover terminal, and a set of insulation structures. The apparatus also includes a conductor configured to electrically connect the second capacitor terminal of at least one of the capacitive devices to the common cover terminal.

25 Claims, 19 Drawing Sheets

Related U.S. Application Data

May 3, 2017, now Pat. No. 10,134,528, which is a continuation of application No. 15/097,383, filed on Apr. 13, 2016, now Pat. No. 10,249,439, which is a continuation of application No. 13/601,205, filed on Aug. 31, 2012, now Pat. No. 9,343,238, which is a continuation of application No. 12/945,979, filed on Nov. 15, 2010, now Pat. No. 8,270,143, which is a continuation of application No. 12/246,676, filed on Oct. 7, 2008, now Pat. No. 7,835,133, which is a continuation of application No. 11/733,624, filed on Apr. 10, 2007, now Pat. No. 7,474,519, which is a continuation of application No. 11/317,700, filed on Dec. 23, 2005, now Pat. No. 7,203,053.

(60) Provisional application No. 60/669,712, filed on Apr. 7, 2005.

(51) Int. Cl.
*H01G 4/224* (2006.01)
*H01G 4/228* (2006.01)

(56) References Cited

U.S. PATENT DOCUMENTS

| | | |
|---|---|---|
| 1,789,949 A | 1/1931 | Georgiev |
| 1,943,714 A | 1/1934 | Bailey |
| 2,050,062 A | 8/1936 | Mershon |
| 2,202,166 A | 5/1940 | Peck |
| D122,825 S | 10/1940 | Peck |
| D124,726 S | 1/1941 | Shimer |
| D130,952 S | 12/1941 | Miller |
| 2,296,123 A | 9/1942 | Stimson |
| 2,569,925 A | 10/1951 | Deeley |
| 2,607,833 A | 8/1952 | Schomaker |
| 2,779,813 A | 1/1957 | Collins |
| 2,896,008 A | 7/1959 | Putz |
| 2,968,752 A | 1/1961 | Rubinstein |
| 3,010,056 A | 11/1961 | Kurland |
| 3,015,687 A | 1/1962 | Ruscito |
| 3,041,477 A | 6/1962 | Lucien et al. |
| 3,210,457 A | 10/1965 | Hancock |
| 3,246,205 A | 4/1966 | Miller |
| 3,302,081 A | 1/1967 | Grahame |
| 3,304,473 A | 2/1967 | Netherwood et al. |
| D209,054 S | 10/1967 | Braiman et al. |
| D210,210 S | 2/1968 | Braiman et al. |
| 3,377,510 A | 4/1968 | Rayno |
| 3,454,858 A | 7/1969 | Robinson |
| 3,473,088 A | 10/1969 | Ernst |
| 3,524,614 A | 8/1970 | Sorth |
| 3,553,542 A | 1/1971 | Stonemetz |
| 3,555,370 A | 1/1971 | Bowling |
| 3,593,066 A | 7/1971 | Norman |
| 3,771,321 A | 11/1973 | Maksy |
| 3,803,457 A | 4/1974 | Yamamoto |
| 3,921,041 A | 11/1975 | Stockman |
| 3,955,170 A | 5/1976 | Geishecker |
| 3,988,650 A | 10/1976 | Fritze |
| 4,009,425 A | 2/1977 | Muranaka |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shim et al. |
| 4,112,424 A | 9/1978 | Lapeyre |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,363,078 A | 12/1982 | Dwyer |
| 4,398,782 A | 8/1983 | Markarian |
| 4,408,818 A | 10/1983 | Markarian |
| 4,420,791 A | 12/1983 | Shedigian |
| 4,447,854 A | 5/1984 | Markarian |
| 4,459,637 A | 7/1984 | Shedigian |
| 4,486,809 A | 12/1984 | Deak et al. |
| 4,546,300 A | 10/1985 | Shaikh |
| 4,558,394 A | 12/1985 | Stockman |
| 4,586,107 A | 4/1986 | Price |
| 4,609,967 A | 9/1986 | Shedigian |
| 4,621,301 A | 11/1986 | Shedigian |
| 4,631,631 A | 12/1986 | Hodges et al. |
| 4,633,365 A | 12/1986 | Stockman |
| 4,633,367 A | 12/1986 | Strange et al. |
| 4,633,369 A | 12/1986 | Lapp et al. |
| 4,639,828 A | 1/1987 | Strange et al. |
| 4,642,731 A | 2/1987 | Shedigian |
| 4,698,725 A | 10/1987 | MacDougall et al. |
| 4,737,785 A | 4/1988 | Zottnik |
| 4,754,361 A | 6/1988 | Venturini |
| 4,768,129 A | 8/1988 | Sasaki |
| 4,811,161 A | 3/1989 | Sasaki |
| 4,812,941 A | 3/1989 | Rice et al. |
| 4,813,116 A | 3/1989 | Thiel et al. |
| 4,897,760 A | 1/1990 | Bourbeau |
| D307,000 S | 4/1990 | Sasaki |
| 4,992,910 A | 2/1991 | Evans |
| 5,006,726 A | 4/1991 | Okumura |
| 5,019,934 A | 5/1991 | Bentley et al. |
| 5,032,948 A | 7/1991 | Sakai |
| 5,138,519 A | 8/1992 | Stockman |
| 5,148,347 A | 9/1992 | Cox et al. |
| 5,196,818 A | 3/1993 | Anderson |
| 5,247,236 A | 9/1993 | Schroeder |
| 5,280,219 A | 1/1994 | Ghanbari |
| 5,313,360 A | 5/1994 | Stockman |
| 5,381,301 A | 1/1995 | Hudis |
| 5,412,532 A | 5/1995 | Nishimori |
| 5,528,120 A | 6/1996 | Brodetsky |
| 5,561,357 A | 10/1996 | Schroeder |
| 5,673,168 A | 9/1997 | Efford et al. |
| 5,691,845 A | 11/1997 | Iwatsuka et al. |
| 5,817,975 A | 10/1998 | Heilmann et al. |
| 5,921,820 A | 7/1999 | Dijkstra |
| 5,940,263 A | 8/1999 | Jakoubovitch |
| 6,009,348 A | 12/1999 | Rorvick et al. |
| 6,014,308 A | 1/2000 | Stockman |
| 6,031,713 A | 2/2000 | Takeisha et al. |
| 6,084,764 A | 7/2000 | Anderson |
| 6,141,205 A | 10/2000 | Nutzman |
| 6,147,856 A | 11/2000 | Karidis |
| 6,157,531 A | 12/2000 | Breyen et al. |
| 6,160,465 A | 12/2000 | Yamaguchi et al. |
| 6,212,058 B1 | 4/2001 | Huber |
| 6,222,270 B1 | 4/2001 | Lee |
| 6,229,236 B1 | 5/2001 | Fisher |
| 6,233,133 B1 | 5/2001 | Weng |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,373,720 B1 | 4/2002 | Fechtig et al. |
| 6,385,490 B1 | 5/2002 | O'Phelan |
| 6,404,618 B1 | 6/2002 | Beard et al. |
| 6,410,184 B1 | 6/2002 | Horiuchi |
| 6,466,429 B1 | 10/2002 | Volfkovich et al. |
| 6,490,158 B1 | 12/2002 | Ellyson et al. |
| 6,538,544 B1 | 3/2003 | Hardy |
| 6,552,893 B2 | 4/2003 | Tanaka |
| 6,697,249 B2 | 2/2004 | Maletin et al. |
| 6,706,079 B1 | 3/2004 | Shmatko et al. |
| 6,720,689 B2 | 4/2004 | Agnes et al. |
| 6,798,677 B2 | 9/2004 | Jakob et al. |
| 6,807,048 B1 | 10/2004 | Nielsen |
| 6,816,541 B1 | 11/2004 | Hong |
| 6,819,545 B1 | 11/2004 | Lobo et al. |
| 6,842,328 B2 | 1/2005 | Schott |
| 6,847,517 B2 | 1/2005 | Iwaida et al. |
| 6,888,266 B2 | 5/2005 | Burke et al. |
| 6,922,330 B2 | 7/2005 | Nielson et al. |

(56) References Cited

U.S. PATENT DOCUMENTS

| | | |
|---|---|---|
| 6,930,874 B2 | 8/2005 | Lobot et al. |
| 6,982,539 B1 | 1/2006 | Ward |
| 6,995,971 B2 | 2/2006 | Norton |
| 7,031,139 B1 | 4/2006 | Fayram |
| 7,046,498 B1 | 5/2006 | Huang |
| D522,456 S | 6/2006 | Matsumoto |
| 7,110,240 B2 | 9/2006 | Breyen |
| 7,184,256 B1 | 2/2007 | Sato |
| 7,203,053 B2 | 4/2007 | Stockman |
| 7,206,186 B1 | 4/2007 | Knight |
| 7,251,123 B2 | 7/2007 | O'Phelan |
| D551,943 S | 10/2007 | Hodjat |
| D562,237 S | 2/2008 | Tu |
| 7,365,959 B1 | 4/2008 | Ward |
| 7,423,861 B2 | 9/2008 | Stockman |
| 7,474,519 B2 | 1/2009 | Stockman |
| 7,474,520 B2 | 1/2009 | Kashihara |
| 7,492,574 B2 | 2/2009 | Fresard et al. |
| 7,511,941 B1 | 3/2009 | Gallay |
| 7,547,233 B2 | 6/2009 | Inoue et al. |
| 7,619,420 B2 | 11/2009 | Stockman |
| 7,667,954 B2 | 2/2010 | Lessner |
| 7,710,713 B2 | 5/2010 | Restorff |
| D621,789 S | 8/2010 | Wang et al. |
| D623,500 S | 9/2010 | Langner |
| 7,835,133 B2 | 11/2010 | Stockman |
| 7,848,079 B1 | 12/2010 | Gordin et al. |
| 7,867,290 B2 | 1/2011 | Nielsen |
| 7,881,043 B2 | 2/2011 | Hirose et al. |
| 7,911,762 B2 | 3/2011 | Stockman |
| 7,911,766 B2 | 3/2011 | Caumont et al. |
| 7,952,854 B2 | 5/2011 | Stockman |
| 7,987,593 B1 | 8/2011 | Gorst |
| 8,029,290 B2 | 10/2011 | Johnson |
| 8,170,662 B2 | 5/2012 | Bocek |
| 8,174,817 B2 | 5/2012 | Georgopoulos et al. |
| 8,270,143 B2 | 9/2012 | Stockman |
| 8,274,778 B2 | 9/2012 | Yoshinaga et al. |
| 8,310,802 B2 | 11/2012 | Fujii et al. |
| 8,331,076 B2 | 12/2012 | Tuncer |
| 8,456,795 B2 | 6/2013 | Stockman |
| 8,465,555 B2 | 6/2013 | Sherwood |
| 8,472,164 B2 | 6/2013 | Kim |
| 8,514,547 B2 | 8/2013 | Galvagni |
| 8,514,548 B2 | 8/2013 | Miller et al. |
| 8,531,815 B2 | 9/2013 | Stockman |
| 8,537,522 B2 | 9/2013 | Stockman |
| 8,559,161 B2 | 10/2013 | Takeoka et al. |
| 8,619,409 B2 | 12/2013 | Yawata et al. |
| 8,761,875 B2 | 6/2014 | Sherwood |
| 8,842,411 B2 | 9/2014 | Zhang |
| 8,853,318 B2 | 10/2014 | Tielemans |
| 8,861,178 B2 | 10/2014 | Terashima et al. |
| 8,861,184 B2 | 10/2014 | Schmidt |
| 8,871,850 B2 | 10/2014 | Koh et al. |
| 8,885,318 B2 | 11/2014 | Stockman |
| 8,891,224 B2 | 11/2014 | Stockman |
| D729,164 S | 5/2015 | Chen |
| 9,105,401 B2 | 8/2015 | Dreissig |
| 9,318,261 B2 | 4/2016 | Stockman |
| 9,324,501 B2 | 4/2016 | Stockman |
| 9,343,238 B2 | 5/2016 | Stockman |
| 9,378,893 B2 | 6/2016 | Stockman |
| 9,412,521 B2 | 8/2016 | Stockman |
| 9,424,995 B2 | 8/2016 | Stockman |
| 9,466,429 B1 | 10/2016 | Casanova |
| D771,567 S | 11/2016 | Flohe et al. |
| 9,496,086 B2 | 11/2016 | Stockman |
| 9,536,670 B2 | 1/2017 | Stockman |
| 9,859,060 B1 | 1/2018 | Stockman et al. |
| 9,916,934 B1 | 3/2018 | Casanova et al. |
| D818,437 S | 5/2018 | Stockman |
| D818,959 S | 5/2018 | Stockman |
| 10,056,194 B2 | 8/2018 | Stockman |
| 10,056,195 B2 | 8/2018 | Stockman |
| D829,173 S | 9/2018 | Stockman |
| 10,134,528 B2 | 11/2018 | Stockman |
| 10,147,549 B2 | 12/2018 | Stockman |
| 10,147,550 B1 | 12/2018 | Stockman |
| 10,163,571 B2 | 12/2018 | Stockman |
| 10,209,751 B2 | 2/2019 | Zikes |
| 10,249,439 B2 | 4/2019 | Stockman |
| 10,256,195 B2 | 4/2019 | Yamamoto |
| 10,366,840 B1 | 7/2019 | Stockman |
| 10,475,588 B2 | 11/2019 | Stockman |
| 10,497,518 B1 | 12/2019 | Stockman |
| 10,497,520 B1 | 12/2019 | Stockman |
| 10,586,655 B1 | 3/2020 | Stockman |
| D892,741 S | 8/2020 | Biere |
| D893,441 S | 8/2020 | Rao |
| D906,247 S | 12/2020 | Stockman |
| 11,177,074 B1 | 11/2021 | Stockman |
| 11,183,330 B2 | 11/2021 | Stockman |
| 11,183,335 B2 | 11/2021 | Stockman |
| 11,183,336 B2 | 11/2021 | Stockman |
| 11,183,337 B1 | 11/2021 | Stockman |
| 11,183,338 B2 | 11/2021 | Stockman |
| 11,183,341 B1 | 11/2021 | Stockman |
| 11,189,425 B1 | 11/2021 | Stockman et al. |
| 11,189,426 B1 | 11/2021 | Stockman |
| D938,912 S | 12/2021 | Stockman |
| 11,195,663 B2 | 12/2021 | Stockman |
| 11,424,077 B1 | 8/2022 | Stockman et al. |
| 2001/0025618 A1 | 10/2001 | Kelling |
| 2002/0030548 A1 | 3/2002 | Dejima |
| 2005/0272012 A1 | 12/2005 | Logan et al. |
| 2006/0007387 A1 | 1/2006 | Xiao |
| 2006/0067031 A1 | 3/2006 | Crane |
| 2006/0201971 A1 | 9/2006 | Wegman |
| 2006/0227495 A1 | 10/2006 | Stockman |
| 2007/0025051 A1 | 2/2007 | Stockman |
| 2007/0221278 A1 | 9/2007 | Sartorius |
| 2007/0236860 A1 | 10/2007 | Stockman |
| 2007/0279015 A1 | 12/2007 | Livingston et al. |
| 2007/0283707 A1 | 12/2007 | Hatano |
| 2007/0295877 A1 | 12/2007 | Gaydos |
| 2008/0158780 A1 | 7/2008 | Stockman |
| 2008/0217053 A1 | 9/2008 | Vojtila et al. |
| 2009/0001921 A1 | 1/2009 | Mills |
| 2009/0052109 A1 | 2/2009 | Stockman et al. |
| 2009/0059463 A1 | 3/2009 | Ward |
| 2009/0115557 A1 | 5/2009 | Minowa |
| 2009/0219665 A1 | 9/2009 | Stockman |
| 2009/0261762 A1 | 10/2009 | Tsuchiya |
| 2011/0063775 A1 | 3/2011 | Stockman |
| 2011/0075342 A1 | 3/2011 | Gotham et al. |
| 2011/0134584 A1 | 6/2011 | Stockman |
| 2011/0157764 A1 | 6/2011 | Stockman |
| 2011/0228444 A1 | 9/2011 | Lai et al. |
| 2011/0228446 A1 | 9/2011 | Stockman |
| 2011/0317333 A1 | 12/2011 | Chun |
| 2012/0026046 A1 | 2/2012 | Bit-Babik |
| 2013/0003252 A1 | 1/2013 | Stockman |
| 2013/0214720 A1 | 8/2013 | Stockman |
| 2013/0329342 A1 | 12/2013 | Stockman |
| 2013/0343029 A1 | 12/2013 | Stockman |
| 2014/0049205 A1 | 2/2014 | Curiel |
| 2014/0126107 A1 | 5/2014 | Yoda et al. |
| 2014/0138009 A1 | 5/2014 | Lim |
| 2014/0201018 A1 | 7/2014 | Chassin |
| 2014/0232485 A1 | 8/2014 | Bultitude |
| 2014/0285949 A1 | 9/2014 | Stockman |
| 2014/0347784 A1 | 11/2014 | Stockman et al. |
| 2015/0016012 A1 | 1/2015 | Stockman |
| 2015/0022991 A1 | 1/2015 | Stockman et al. |
| 2015/0138690 A1 | 5/2015 | Stockman |
| 2015/0255218 A1 | 9/2015 | Stockman et al. |
| 2015/0287308 A1 | 10/2015 | Shuttleworth |
| 2016/0028230 A1 | 1/2016 | Elfman |
| 2016/0203916 A1 | 7/2016 | Stockman |
| 2016/0233030 A1 | 8/2016 | Stockman |
| 2017/0011855 A1 | 1/2017 | Stockman et al. |
| 2017/0032898 A1 | 2/2017 | Stockman |
| 2017/0110252 A1 | 4/2017 | Stockman |

(56) References Cited

U.S. PATENT DOCUMENTS

| | | |
|---|---|---|
| 2017/0186554 A1 | 6/2017 | Stockman |
| 2017/0229242 A1 | 8/2017 | Goodson et al. |
| 2017/0236646 A1 | 8/2017 | Stockman |
| 2017/0372838 A1 | 12/2017 | Casanova et al. |
| 2018/0061600 A1 | 3/2018 | Ito |
| 2018/0090278 A1 | 3/2018 | Stockman et al. |
| 2018/0254150 A1 | 9/2018 | Stockman et al. |
| 2018/0261391 A1 | 9/2018 | Stockman |
| 2019/0057815 A1 | 2/2019 | Stockman |
| 2019/0057817 A1 | 2/2019 | Stockman |
| 2020/0066470 A1 | 2/2020 | Mitchell |
| 2020/0143994 A1 | 5/2020 | Stockman |
| 2020/0155983 A1 | 5/2020 | Maeda |
| 2020/0161057 A1 | 5/2020 | Stockman et al. |
| 2020/0211780 A1 | 7/2020 | Stockman |
| 2020/0251285 A1 | 8/2020 | Stockman |
| 2022/0328247 A1 | 10/2022 | Stockman |
| 2022/0328254 A1 | 10/2022 | Stockman |
| 2022/0336156 A1 | 10/2022 | Stockman |
| 2022/0336157 A1 | 10/2022 | Stockman |
| 2022/0336161 A1 | 10/2022 | Stockman |
| 2022/0344101 A1 | 10/2022 | Stockman |
| 2022/0352789 A1 | 11/2022 | Waldrop et al. |

FOREIGN PATENT DOCUMENTS

| | | |
|---|---|---|
| CN | 3607691 | 2/2007 |
| CN | 101991323 | 3/2011 |
| CN | 104201077 | 12/2014 |
| CN | 204351550 | 5/2015 |
| CN | 304806073 | 9/2018 |
| CN | 305610350 | 2/2020 |
| CN | 305625370 | 2/2020 |
| CN | 305780976 | 5/2020 |
| EP | 129714 | 1/1985 |
| EP | 1115128 | 7/2001 |
| EP | 2587503 | 3/2014 |
| FR | 2343221 | 9/1977 |
| GB | 517718 | 2/1940 |
| GB | 2169747 | 7/1986 |
| GB | 2070861 | 12/1997 |
| JP | S498747 A | 1/1974 |
| JP | S498748 | 2/1974 |
| JP | 07211596 A | 8/1995 |
| JP | 2007059477 A | 3/2007 |
| JP | 2015130259 | 7/2015 |
| KR | 20160061825 | 6/2016 |
| MX | 62279 | 8/2021 |
| WO | WO 2010031594 | 3/2010 |
| WO | WO 2010037186 | 4/2010 |
| WO | WO 2014190072 | 11/2014 |
| WO | WO 2020123834 | 6/2020 |

OTHER PUBLICATIONS

Ebay, "25 + 3 uF MFD × 370 / 440 VAC Motor Run Capacitator AmRad USA2224BA—Made in USA," ebay.com, 2020 retrieved from URL: https://www.ebay.com/itm/25-3-uF-MFD-x-370-440-VAC-Motor-Run-Capacitor-AmRad-USA2224BA-Made-in-USA-/164162793031; retrieved on Oct. 28, 2020, 15 pages.
NMR.mgh.harvard.edu [online], "Strategies to Repair or Replace Old Electrolytic Capacitors," available on or before Nov. 30, 2001, via Internet Archive: Wayback Machine URL <https://web.archive.org/web/20011130084328/https://www.nmr.mgh.harvard.edu/~reese/electrolytics/> retrieved on Apr. 22, 2021, URL <https://www.nmr.mgh.harvard.edu/-reese/electrolytics/, >, 8 pages.
YouTube video "AmRad's Turbo Installation" published on Apr. 22, 2012 by AmRad Engineering {link: https://www.youtube.com/watch?v=axo86NCbuNs&lc=UgguTwZgduBg5HgCoAEC}, 6 pages.
YouTube video "HVAC 1 AC Repairs 1 Turbo 200 Capacitor Install 1 Crest Hill, IL 12" published on Jul. 15, 2011 by NLB Heating & Cooling hereafter referred to as NLB {link to video : https://www.youtube.com/watch?v=U7h7pg12t6M}, 5 pages.

"AC Capacitors," brochure by AmRad Engineering, Inc., undated (4 pages).
"American Radionic Co., Inc. Introduces . . . The World's First Multiple Metallized Film Dielectric Capacitor Produced from a Single Winding! The Patented Ultramet™ Capacitor," poster by American Radionic Co., Inc, (undated) (one page).
"Industrial Power Factor Correction Capacitors," Cornell Dubilier, Undated (1 page).
"The Patented Ultramet™ Capacitor," poster by American Radionic Co., Inc., (undated) (three pages).
"The Patented Ultramet™ Capacitor. A product of years of American Radionic research & development," poster by American Radionic Co., Inc. (undated) (one page).
Photograph 1 from Defendants' First Supplemental Disclosure of Non-Infringement and Invalidity Contentions, undated (1 page).
Photograph 10, undated (1 page).
Photograph 11, undated (1 page).
Photograph 12, undated (1 page).
Photograph 13, undated (1 page).
Photograph 14, undated (1 page).
Photograph 15, undated (1 page).
Photograph 16, undated (1 page).
Photograph 17, undated (1 page).
Photograph 18, undated (1 page).
Photograph 19, undated (1 page).
Photograph 2 from Defendants' First Supplemental Disclosure of Non-Infringement and Invalidity Contentions, undated (1 page).
Photograph 20, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, undated (1 page).
Photograph 9, undated (1 page).
"American Radionics—Home of the Turbo200 MultiUse Capacitor," online archive of website captured at http://web.archive.org/web/20050309191805fw_/http://www.americanradionic.com/home, Mar. 9, 2005, (16 pages), (accessed May 29, 2014).
"American Radionic Co., Inc. Introduces A New Circuit Component The Patented Ultramet™ Capacitor," poster by American Radionic Co., Inc., (poster undated, 1980 year date appears below one image), (one page).
"American Radionic Co., Inc. Introduces A New Circuit Component, The Patented Ultramet™ Capacitor," poster by American Radionic Co., Inc., which is reprint from Electronic News dated Feb. 11, 1980, (one page).
"American Radionic Company's Chronology of Patents, New Products and Technology Transfer Programs—From the Present, to the Past, a Thirty-Five Year Review," online website having URL: http:/www.americanradionic.com/content/blogcategory/13/29/8/16 , accessed May 19, 2014 (undated) 3 pages).
"American Radionic Introduces Capacitors Without Compromise", color brochure, 1989, (1 page).
"AmRad Engineering: Universal Capacitor," The Air Conditioning|Heating|Refrigeration News, Jan. 29, 2005, Printout of website having URL: "http://www.archrnews.com/articles/print/amrad-engineering-universal-capacitor" (accessed Jun. 2, 2014) (1 page).
"Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).
"Capacitors—Motor Run, Oil Filled Capacitors, AC Rated. AmRad." Online archive of website captured at http:/webarchive.org/web/20011126195819/http://www.americanradionic.com, Nov. 26, 2001, (13 pages) (accessed May 29, 2014).

(56) References Cited

OTHER PUBLICATIONS

"Capacitors—Motor Run, Oil Filled Capacitors, AC Rated. AmRad." Printout of website having URL: http://amradcapacitors.com/index.htm, Jan. 3, 2003(20 pages).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).
Amazon. <https://www.amazon.com/TEMCo-Capacitor-RC0120-50-Electric-Motor/dp/B01HOS87X6/ref+pd_sim_328_5> Aug. 29, 2014. TEMCo Dual Run Capacitor RC0120-50/5 nnfd 370 V 440 V VAC volt 50+5uf AC Electric Motor HVAC, 6 pages.
Amazon. <URL: https://www.amazon.com/AmRad-Turbo-200-Mini-Oval/dp/B00KQSKDOY/ref=pd_sbs_60_4?_encoding=UTF8&pd_rd_i=B00KQSKDOY&pd_rd_r=A6')/0E2')/080')/0A6.> May 5, 2015. AmRad Turbo 200 Mini Oval Capacitor with label and color trim, 5 pages.
Amazon. <URL: https://www.amazon.com/Amrad-Turbo-Universal-Motor-Capacitor/dp/B00B610TOM/ref=pd_rhf_dp_s_cp_0_7?_encoding=UTF8&pd_rd_i=B00B610TOM&pd_rd_r=N5WYCAD5Y36C86DFWDEG&pd_rd_w=6tW71&pd_rd_wg=DWEJcApsc=1&refRID=N5WYCAD5Y36C86DFWDEG.> Jan. 27, 2013. Amrad Turbo 200X Universal Motor Run Capacitor.
Amazon. <URL: https://www.amazon.com/AmRad-USA2227-MFD-370-Volt/dp/B00GSU3YV8/ref=pd_day0_328_6?_encoding=UTF8&pd_rd_i=B00GSU3YV8&pd_rd_r%E2')/080')/0A6.> Jun. 29, 2014, AmRad Dual Run Capacitor, 6 pages.
Amazon. <URL: https://www.amazon.com/CPT00656-Trane-Round-Capacitor-Upgrade/dp/B00EVTIOMC/ref=cm_cr_arp_d_product_top?ie=UTF8>May 11, 2016. Replacement Trane Round Dual Run Capacitor, 6 pages.
Amazon. <URL: https://www.amazon.com/gp/product/B01HPK5ANO/refs=9_dcacsd_dcoop_bw_c_x_6_w.> Aug. 21, 2016, Titan TRCFD405 Dual Rated Motor Run Capacitor, 6 pages.
Amazon. <URL: https://www.amazon.com/Labels-Protective-Backed-Clean-Remove-Adhesive/dp/B00VIDW1C1/ref=sr_1_18?ie=UTF8&clid=1522957818&sr=8-18&keycY0E2')/080')/0A6.> Apr. 1, 2015, Labels, 7 pages.
Amazon. <URL: https://www.amazon.com/MARS-Motors-Armatures-12788-Capacitor/dp/B00COYS2CM/ref=pd_sim_328_6?_encoding=UTF8&pd_rd_i=B00COYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ> Jan. 25, 2012, MARS Dual Run Capacitor, 7 pages.
Amazon. <URL: https://www.amazon.conr/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=y1jQe&pd_rd_wg=mH0n1&psc=1&refRID=SX1DRWZQZ8SH12JWHYH2&dp1D=31IxzeyCr/0252B7L&preST=_QL70_&dpSrc=detail.> May 1, 2015, Packard Capacitor, 5 pages.
Amazon. <URL: https://www.amazon.com/Universal-Capacitor-Trane-Replacement-USA2031/dp/B00GSU4OKW/ref=pd_sim_328_3?_encoding=UTF8&pd_rd_i=B00GSU4OKW&pd_rd_r=YX6P84XR7NY113X4DWJG&pd_rd_w=gejaD&pd_rd_wg=NLVIY&psc=1&refRID=YX6P84XR7NY113X4DWJG> Nov. 26, 2014. Am Rad Oval Universal Capacitor with label and color trim, 6 pages.
Amazon. <URL:https://www.amazon.com/dp/B00FL70C0U/ref=cm_sw_r_cp_ep_dp_qIIZBbFD278ZE> Dec. 4, 2013. AmRad Engineering USA2215 Round Motor Run Capacitor, 40 MFD, 370_440 Vac—Pipe Fittings, 6 pages.
Amazon. <URL:https://www.amazon.com/dp/B01F7P8GJO/ref=sspa_dk_detail_4?psc=1.> Aug. 1, 2016, TradePro PowerWell Dual Run Round Capacitor, 6 pages.
Amazon. Link: https://www.amazon.com/Round-Universal-Capacitor-Replacement-USA2235/dpB00GSU4401/ref=cnn_cr_arp_d_product_top?ie=UTF8. Jun. 20, 2014. Round Dual Universal Capacitor, (Year: 2014), 6 pages.

Answer and affirmative defenses to Complaint by Cornell-Dubliner Electronics, Inc. (Allaman, Melissa) (Entered: Jan. 9, 2015).
Answer and affirmative defenses to Complaint by Packard Inc. (Allaman, Melissa) (Entered: Jan. 9, 2015).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015, (VMF). (Entered: Feb. 10, 2015).
PCT International Search Report and Written Opinion in International Appln. No. PCT/US2019/068738, dated Mar. 10, 2020 13 pages.
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014).
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).
Defendants' First Supplemental Disclosure of Non-Infringement and Invalidity Contentions *American Radionic, Inc.*, v. *Packard, Inc., and Cornell-Dubilier Electronics, Inc.*, No. 6:14-cv-01881-RBD-KRS.
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
Edisontechcenter. Link: http://edisontechcenter.org/batteries.html#drycell. 2014. Bright Star 1.5 V Columbia dry cell. (Year: 2014), 10 pages.
Eveready. Link: http://www.eveready.com/about-us/battery-history. Visited Nov. 30, 2018. 1950s Eveready Battery. (Year: 2018), 2 pages.
First Amended Answer and affirmative defenses to 1 Complaint by Cornell-Dubliner Electronics, Inc. (Allaman, Melissa) (Entered: Feb. 4, 2015).
First Amended Answer and affirmative defenses to 1 Complaint by Packard Inc. (Allaman, Melissa) (Entered: Jan. 9, 2015).
Grainger, "Round Motor Dual Run Capacitor, 40/5 Microfarad Rating, 370VAC Voltage," Retrieved from the Internet: URL<https://www.grainger.com/product/5CMW3&AL!2966!3!166587674359!!!g!82128730437!?cm_mmc=PPC:+Google+PLA?campaignid=719691765&s_kwcid=AL!2966!3!166587674359!!!!82128730437!&ef_id=WRSnxQAAAILWhR1b:20170824174108:s>. Visited Aug. 24, 2017, Capacitor.
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, dated Oct. 2, 2014, 12 pages.
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.

(56) References Cited

OTHER PUBLICATIONS

Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance," PCIM Power Electronics 2001 Proceeding for the PowerSystems World Conference, Sep. 2001, 8 pages.
Mallory Distributor Products Co., 1967 Precision Electronic Components Catalog, 52 pages.
Minute Entry, Proceedings of Claim Construction Hearing held before Judge Roy B. Dalton, Jr. on Aug. 24, 2015, Court Report: Arnie First (VMF) (FMV). (Entered: Aug. 24, 2015).
PCT International Preliminary Report on Patentability in International Appln. No. PCT/US2019/068738, dated Jul. 8, 2021, 11 pages.
PCT International Search Report and Written Opinion in International Appln. No. PCT/US2007/89034, dated Apr. 18, 2008, 9 pages.
PCT International Preliminary Report on Patentability in International Appln. No. PCT/US2007/89034, dated Jul. 9, 2009, 6 pages.
PCT International Preliminary Report on Patentability in International Appln. No. PCT/US2014/039003, dated Dec. 3, 2015, 7 pages.
Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Order granting 69 Motion for Consent Judgment and Injunction, Signed by Judge Roy B. Dalton, Jr. on Nov. 5, 2015. (CAC) (Entered Nov. 5, 2015).
Parente, Audrey, "Can-sized device the right fit," The Daytona Beach News-Journal, Jan. 3, 2005 (2 pages).
Plaintiff's Brief re 59 Declaration Plaintiff's Claim Construction Brief filed by American Radionic Company, Inc. (Graubart, Noah) (Entered May 18, 2015).
Response to Plaintiff's Claim Constmction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015).
Ruby Lane, SuzansTreasures.shop, Link: https://www.rubylane.com/item/34499-CCKx20-x20205/Mazon-Cobalt-Glass-Jar-Medicine-Bottle. Visited Jul. 22, 2019. 1940s Mazon Cobalt Glass Jar Medicine Bottle.
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015).
Transcript of Markman Hearing held on Aug. 24, 15 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015, (ARF) (Entered: Oct. 1, 2015).
Wikimedia Commons. Link: https://connnnons.wikimedia.org/wiki/File:PP4-PP3-batteries.jpg. Oct. 22, 2016. Eveready PP4 battery, (Year: 2016), 17 pages.
YouTube. <URL: https://www.youtube.com/watch?v=19A9IvQ611A&t=3s.> Oct. 1, 2015. GE Dual Run Capacitor, 5 pages.
YouTube. <URL: https://www.youtube.com/watch?v=R5B189BWrz0.> Jul. 29, 2011. HVAC Service: Install New Turbo 200 Capacitor.
YouTube. <URL: https://www.youtube.com/watch?v=U7h7pg12t6M> Jul. 15, 2011. How To Install The Turbo 200 Capacitor.
YouTube. <URL: https://www.youtube.com/watch?v=Xiw_xHXJHUg.> Sep. 4, 2011. AmRad Dual Run Capacitor, 4 pages.

Single Value Capacitors

| Item No. | Green 2.5 Mfd. | White 5.0 Mfd. | White 5.0 Mfd. | Red 10.0 Mfd. | Yellow 20.0 Mfd. | Blue 25.0 Mfd. | | Total Value Mfd. |
|---|---|---|---|---|---|---|---|---|
| 1 | 2.5 | | | | | | Equals | 2.5 |
| 2 | | 5.0 | | | | | Equals | 5.0 |
| 3 | 2.5 | 5.0 | | | | | Equals | 7.5 |
| 4 | | | | 10.0 | | | Equals | 10.0 |
| 5 | 2.5 | | | 10.0 | | | Equals | 12.5 |
| 6 | | 5.0 | | 10.0 | | | Equals | 15.0 |
| 7 | 2.5 | 5.0 | | 10.0 | | | Equals | 17.5 |
| 8 | | | | | 20.0 | | Equals | 20.0 |
| 9 | 2.5 | | | | 20.0 | | Equals | 22.5 |
| 10 | | 5.0 | | | 20.0 | | Equals | 25.0 |
| 11 | 2.5 | 5.0 | | | 20.0 | | Equals | 27.5 |
| 12 | | | | 10.0 | 20.0 | | Equals | 30.0 |
| 13 | 2.5 | | | 10.0 | 20.0 | | Equals | 32.5 |
| 14 | | 5.0 | | 10.0 | 20.0 | | Equals | 35.0 |
| 15 | 2.5 | 5.0 | | 10.0 | 20.0 | | Equals | 37.5 |
| 16 | | 5.0 | | 10.0 | | 25.0 | Equals | 40.0 |
| 17 | 2.5 | 5.0 | | 10.0 | | 25.0 | Equals | 42.5 |
| 18 | | | | | 20.0 | 25.0 | Equals | 45.0 |
| 19 | 2.5 | | | | 20.0 | 25.0 | Equals | 47.5 |
| 20 | | 5.0 | | | 20.0 | 25.0 | Equals | 50.0 |
| 21 | 2.5 | 5.0 | | | 20.0 | 25.0 | Equals | 52.5 |
| 22 | | | | 10.0 | 20.0 | 25.0 | Equals | 55.0 |
| 23 | 2.5 | | | 10.0 | 20.0 | 25.0 | Equals | 57.5 |
| 24 | | 5.0 | | 10.0 | 20.0 | 25.0 | Equals | 60.0 |
| 25 | 2.5 | 5.0 | | 10.0 | 20.0 | 25.0 | Equals | 62.5 |
| 26 | | 5.0 | 5.0 | 10.0 | 20.0 | 25.0 | Equals | 65.0 |
| 27 | 2.5 | 5.0 | 5.0 | 10.0 | 20.0 | 25.0 | Equals | 67.5 |

These are all Parallel Connections.

← This is the Capacitor Value being Replaced.

Mfd= microfarad

Using this Chart, Add Across to Calculate the Microfarad Values Needed to Obtain the Required Final Total Which will be Equal to the Part being Replaced.

Attach the Enclosed Jumper Wires to the Various Terminals to Obtain the Desired Microfarad Value. Then, Connect One Lead from the Compressor to the Common (Black Cup - Center Terminal) and the Other Lead to the Terminal of Highest Microfarad Value that has been Selected.

FIG. 19

Dual Value Capacitors

This is the Capacitor Value being Replaced.

| Item No. | Fan Total Green 2.5 Mfd. | Herm (Compressor) | | | | | Compressor Total | |
|---|---|---|---|---|---|---|---|---|
| | | White 5.0 Mfd. | White 5.0 Mfd. | Red 10.0 Mfd. | Yellow 20.0 Mfd. | Blue 25.0 Mfd. | | Mfd. |
| 1 | 2.5 | 5.0 | | | | | Equals | 5.0 |
| 2 | 2.5 | | | 10.0 | | | Equals | 10.0 |
| 3 | 2.5 | 5.0 | | 10.0 | | | Equals | 15.0 |
| 4 | 2.5 | | | | 20.0 | | Equals | 20.0 |
| 5 | 2.5 | 5.0 | | | 20.0 | | Equals | 25.0 |
| 6 | 2.5 | 5.0 | | | | 25.0 | Equals | 30.0 |
| 7 | 2.5 | | | 10.0 | | 25.0 | Equals | 35.0 |
| 8 | 2.5 | 5.0 | | 10.0 | | 25.0 | Equals | 40.0 |
| 9 | 2.5 | | | | 20.0 | 25.0 | Equals | 45.0 |
| 10 | 2.5 | 5.0 | | | 20.0 | 25.0 | Equals | 50.0 |
| 11 | 2.5 | | | 10.0 | 20.0 | 25.0 | Equals | 55.0 |
| 12 | 2.5 | 5.0 | | 10.0 | 20.0 | 25.0 | Equals | 60.0 |
| 13 | 2.5 | 5.0 | 5.0 | 10.0 | 20.0 | 25.0 | Equals | 65.0 |

←— This is the Capacitor Value being Replaced.

Mfd=microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

This 2.5mfd Capacitor can also be used as a Direct Substitute for a 3.0Mfd "fan" Capacitor.

These are all Parallel Connections.

FIG. 20

Dual Value Capacitors

This is the Capacitor Value being Replaced.

| Item No. | Fan Total White | Herm (Compressor) | | | | | Compressor Total |
|---|---|---|---|---|---|---|---|
| | | Green | White | Red | Yellow | Blue | |
| | 5.0 Mfd. | 2.5 Mfd. | 5.0 Mfd. | 10.0 Mfd. | 20.0 Mfd. | 25.0 Mfd. | Mfd. |
| 1 | 5.0 | 2.5 | | | | | Equals 2.5 |
| 2 | 5.0 | | 5.0 | | | | Equals 5.0 |
| 3 | 5.0 | 2.5 | 5.0 | | | | Equals 7.5 |
| 4 | 5.0 | | | 10.0 | | | Equals 10.0 |
| 5 | 5.0 | 2.5 | | 10.0 | | | Equals 12.5 |
| 6 | 5.0 | | 5.0 | 10.0 | | | Equals 15.0 |
| 7 | 5.0 | 2.5 | 5.0 | 10.0 | | | Equals 17.5 |
| 8 | 5.0 | | | | 20.0 | | Equals 20.0 |
| 9 | 5.0 | 2.5 | | | 20.0 | | Equals 22.5 |
| 10 | 5.0 | | 5.0 | | 20.0 | | Equals 25.0 |
| 11 | 5.0 | 2.5 | 5.0 | | 20.0 | | Equals 27.5 |
| 12 | 5.0 | | | 10.0 | 20.0 | | Equals 30.0 |
| 13 | 5.0 | 2.5 | | 10.0 | 20.0 | | Equals 32.5 |
| 14 | 5.0 | | 5.0 | 10.0 | 20.0 | | Equals 35.0 |
| 15 | 5.0 | 2.5 | 5.0 | 10.0 | 20.0 | | Equals 37.5 |
| 16 | 5.0 | | 5.0 | 10.0 | | 25.0 | Equals 40.0 |
| 17 | 5.0 | 2.5 | 5.0 | 10.0 | | 25.0 | Equals 42.5 |
| 18 | 5.0 | | | | 20.0 | 25.0 | Equals 45.0 |
| 19 | 5.0 | 2.5 | | | 20.0 | 25.0 | Equals 47.5 |
| 20 | 5.0 | | 5.0 | | 20.0 | 25.0 | Equals 50.0 |
| 21 | 5.0 | 2.5 | 5.0 | | 20.0 | 25.0 | Equals 52.5 |
| 22 | 5.0 | | | 10.0 | 20.0 | 25.0 | Equals 55.0 |
| 23 | 5.0 | 2.5 | | 10.0 | 20.0 | 25.0 | Equals 57.5 |
| 24 | 5.0 | | 5.0 | 10.0 | 20.0 | 25.0 | Equals 60.0 |
| 25 | 5.0 | 2.5 | 5.0 | 10.0 | 20.0 | 25.0 | Equals 62.5 |

This is the Capacitor Value being Replaced.

Mfd= microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

The 5.0Mfd Capacitor (White Cup) that is Closest to the Green Cup can be used to Replace a 4.0Mfd Fan Motor Capacitor.

These are all Parallel Connections.

FIG. 21

This is the Capacitor Value being Replaced.

Dual Value Capacitors

| Item No. | White 5.0 Mfd. | Green 2.5 Mfd. | | Fan Total | Herm (Compressor) 5.0 Mfd. | 10.0 Mfd. | 20.0 Mfd. | 25.0 Mfd. | | Compressor Total Mfd. |
|---|---|---|---|---|---|---|---|---|---|---|
| 1 | 5.0 | 2.5 | = | 7.5 | | 10.0 | | | Equals | 10.0 |
| 2 | 5.0 | 2.5 | = | 7.5 | 5.0 | 10.0 | | | Equals | 15.0 |
| 3 | 5.0 | 2.5 | = | 7.5 | | | 20.0 | | Equals | 20.0 |
| 4 | 5.0 | 2.5 | = | 7.5 | | | | 25.0 | Equals | 25.0 |
| 5 | 5.0 | 2.5 | = | 7.5 | 5.0 | | | 25.0 | Equals | 30.0 |
| 6 | 5.0 | 2.5 | = | 7.5 | | 10.0 | | 25.0 | Equals | 35.0 |
| 7 | 5.0 | 2.5 | = | 7.5 | 5.0 | 10.0 | | 25.0 | Equals | 40.0 |
| 8 | 5.0 | 2.5 | = | 7.5 | | | 20.0 | 25.0 | Equals | 45.0 |
| 9 | 5.0 | 2.5 | = | 7.5 | 5.0 | | 20.0 | 25.0 | Equals | 50.0 |
| 10 | 5.0 | 2.5 | = | 7.5 | | 10.0 | 20.0 | 25.0 | Equals | 55.0 |
| 11 | 5.0 | 2.5 | = | 7.5 | 5.0 | 10.0 | 20.0 | 25.0 | Equals | 60.0 |

These are all Parallel Connections.

← This is the Capacitor Value being Replaced.

Mfd.=microfarad

Using this Chart, Add Across to Calculate the Microfarad Values Needed to Obtain the Required Final Total Which will be Equal to the Part being Replaced.

Use the Enclosed Jumper Wires to Actually Obtain the Desired Microfarad Value.

FIG. 22

Dual Value Capacitors

This is the Capacitor Value being Replaced. ← This is the Capacitor Value being Replaced.

Mfd=microfarad

| Item No. | Fan Total Red 10.0 Mfd. | Herm (Compressor) Green 2.5 Mfd. | White 5.0 Mfd. | White 5.0 Mfd. | Yellow 20.0 Mfd. | Blue 25.0 Mfd. |  | Compressor Total Mfd. |
|---|---|---|---|---|---|---|---|---|
| 1 | 10.0 |  | 5.0 | 5.0 |  |  | Equals | 10.0 |
| 2 | 10.0 | 2.5 | 5.0 | 5.0 |  |  | Equals | 12.5 |
| 3 | 10.0 |  |  |  | 20.0 |  | Equals | 20.0 |
| 4 | 10.0 | 2.5 |  |  | 20.0 |  | Equals | 22.5 |
| 5 | 10.0 |  |  |  |  | 25.0 | Equals | 25.0 |
| 6 | 10.0 | 2.5 |  |  |  | 25.0 | Equals | 27.5 |
| 7 | 10.0 |  | 5.0 |  |  | 25.0 | Equals | 30.0 |
| 8 | 10.0 | 2.5 |  | 5.0 |  | 25.0 | Equals | 32.5 |
| 9 | 10.0 |  | 5.0 | 5.0 |  | 25.0 | Equals | 35.0 |
| 10 | 10.0 | 2.5 | 5.0 | 5.0 |  | 25.0 | Equals | 37.5 |
| 11 | 10.0 |  |  |  | 20.0 | 25.0 | Equals | 45.0 |
| 12 | 10.0 | 2.5 |  |  | 20.0 | 25.0 | Equals | 47.5 |
| 13 | 10.0 |  |  | 5.0 | 20.0 | 25.0 | Equals | 50.0 |
| 14 | 10.0 | 2.5 |  | 5.0 | 20.0 | 25.0 | Equals | 52.5 |
| 15 | 10.0 |  | 5.0 | 5.0 | 20.0 | 25.0 | Equals | 55.0 |
| 16 | 10.0 | 2.5 | 5.0 | 5.0 | 20.0 | 25.0 | Equals | 57.5 |

These are all Parallel Connections.

FIG. 23

CAPACITOR FOR MULTIPLE REPLACEMENT APPLICATIONS

CROSS REFERENCE TO RELATED APPLICATIONS

This application is a continuation application and claims priority under 35 USC § 120 to U.S. application Ser. No. 16/678,500, filed Nov. 8, 2019, which is a continuation of U.S. application Ser. No. 16/195,077, filed Nov. 19, 2018, which is a continuation of U.S. application Ser. No. 15/585,782, filed May 3, 2017, now U.S. Patent No. 10,134,528, which is a continuation of U.S. application Ser. No. 15/097,383, filed Apr. 13, 2016, now U.S. Pat. No. 10,249,439, which is a continuation of U.S. application Ser. No. 13/601,205, filed Aug. 31, 2012, now U.S. Pat. No. 9,343,238 issued on May 17, 2016, which is a continuation of U.S. application Ser. No. 12/945,979, filed Nov. 15, 2010, now U.S. Pat. No. 8,270,143 issued on Sep. 18, 2012, which is a continuation of U.S. application Ser. No. 12/246,676, filed Oct. 7, 2008, now U.S. Pat. No. 7,835,133 issued on Nov. 16, 2010, which is a continuation application of U.S. application Ser. No. 11/733,624, filed Apr. 10, 2007, now U.S. Pat. No. 7,474,519 issued on Jan. 6, 2009, which is a continuation application of U.S. application Ser. No. 11/317,700, filed on December 23, 2005, now U.S. Pat. No. 7,203,053 issued on Apr. 10, 2007, which claims benefit to U.S. Provisional Application Serial No. 60/669,712, filed Apr. 7, 2005.

FIELD OF THE INVENTION

The invention herein relates to a capacitor with multiple capacitor sections selectively connectable to match the capacitance or capacitances of one or more capacitors being replaced.

BACKGROUND OF THE INVENTION

One common use for capacitors is in connection with the motors of air-conditioning systems. The systems often employ two capacitors, one used in association with a compressor motor and another smaller value capacitor for use in association with a fan motor. Air-conditioning systems of different BTU capacity, made by different manufacturers or being a different model all may use capacitors having different values. These capacitors have a finite life and sometimes fail, causing the system to become inoperative.

A serviceman making a service call usually will not know in advance whether a replacement capacitor is necessary to repair an air-conditioning system, or what value capacitor or capacitors might be needed to make the repair. One option is for the serviceman to carry a large number of capacitors of different values in the service truck, but it is difficult and expensive to maintain such an inventory, especially because there can be a random need for several capacitors of the same value on the same day. The other option is for the serviceman to return to the shop or visit a supplier to pick up a replacement capacitor of the required value. This is inefficient as the travel time to pick up parts greatly extends the overall time necessary to complete a repair. This is extremely detrimental if there is a backlog of inoperative air-conditioning systems on a hot day. This problem presents itself in connection with air-conditioning systems, but is also found in any situation where capacitors are used in association with motors and are replaced on service calls. Other typical examples are refrigeration and heating systems, pumps, and manufacturing systems utilizing compressors.

A desirable replacement capacitor would have the electrical and physical characteristics of the failed capacitor, i.e. it should provide the same capacitance value or values at the same or higher voltage rating, be connectable using the same leads and be mountable on the same brackets or other mounting provision. It should also have the same safety protection, as confirmed by independent tests performed by Underwriter Laboratories or others. Efforts have been made to provide such a capacitor in the past, but they have not resulted in a commercially acceptable capacitor adapted for replacing capacitors having a wide range of capacitance values.

My U.S. Pat. Nos. 3,921,041 and 4,028,595 disclose dual capacitor elements in the form of two concentric wound capacitor sections. My U.S. Pat. No. 4,263,638 also shows dual capacitors sections formed in a wound capacitive element, and my U.S. Pat. No. 4,352,145 shows a wound capacitor with dual elements, but suggests that multiple concentric capacitive elements may be provided, as does my U.S. Pat. Nos. 4,312,027 and 5,313,360. None of these patents show a capacitor having electrical and physical characteristics necessary to replace any one of the variety of failed capacitors that might be encountered on a service call.

An effort to provide a capacitor with multiple, selectable capacitance values is described in my U.S. Pat. No. 4,558,394. Three capacitance sections are provided in a wound capacitor element that is encapsulated in a plastic insulating material. An external terminal lug is connected with one of capacitor's sections and a second external terminal lug is provided with a common connection to all three capacitor sections. Pre-wired fixed jumper leads each connect the three capacitive sections in parallel, and the pre-wired fixed jumper leads have a portion exposed above the plastic encapsulation. This permits one or two jumper leads to be severed to remove one or two of the capacitor sections from the parallel configuration, and thereby to adjust the effective capacitance value across the terminal lugs. The '394 patent suggests that further combinations could be made with different connections, but does not provide any suitable means for doing so. Another attempt to provide a capacitor wherein the capacitance may be selected on a service call is described in my U.S. Pat. No. 5,138,519. This capacitor has two capacitor sections connected in parallel, and has two external terminals for connecting the capacitor into a circuit. One of the terminals is rotatable, and one of the capacitor sections is connected to the rotatable terminal by a wire which may be broken by rotation of the terminal. This provides for selectively removing that capacitor section and thereby reducing the capacitance of the unit to the value of the remaining capacitor. This capacitor provides a choice of only two capacitance values in a fluid-filled case with a cover incorporating a pressure interrupter system.

In another effort to provide a universal adjustable capacitor for AC applications, American Radionic Co., Inc. produced a capacitor having five concentric capacitor sections in a cylindrical wound capacitor element. A common lead was provided from one end of the capacitor sections, and individual wire leads were provided from the other ends of the respective capacitor sections. The wound capacitor element was encapsulated in a plastic insulating material with the wire leads extending outwardly from the encapsulating material. Blade connectors were mounted at the ends of the wire leads, and sliding rubber boots were provided to expose the terminals for making connections and for shielding the terminals after connections were made. Various capacitance values could be selected by connecting various ones of the capacitor sections in parallel relationship, in series relationship, or in combinations of parallel and series relationships. In a later version, blade terminals were mounted on the encapsulating material. These capacitors did not meet the needs of servicemen. The connections were difficult to accomplish and the encapsulated structure did not provide pressure interrupter protection in case of capacitor failure, wherein the capacitors did not meet industry safety standards and did not achieve commercial acceptance or success.

Thus, although the desirability of providing a serviceman with a capacitor that is adapted to replace failed capacitors of a variety of values has been recognized for a considerable period of time, a capacitor that meets the serviceman's needs in this regard has not heretofore been achieved. This is a continuing need and a solution would be a considerable advance in the art.

SUMMARY OF THE INVENTION

It is a principal object of the invention herein to provide a capacitor that is connectable with selectable capacitance values.

It is another object of the invention herein to provide a capacitor incorporating multiple capacitance values that may be connected in the field to replace the capacitance value or values of a failed capacitor.

It is a further object of the invention herein to provide a capacitor having the objectives set forth above and which operates to disconnect itself from an electrical circuit upon a pressure-event failure.

It is also an object of the invention herein to incorporate multiple capacitance values in a single replacement capacitor that is adapted for connecting selected ones of the multiple capacitance values into a circuit.

Yet another object of the invention herein to provide a capacitor having one or more of the foregoing objectives and which provides for safely making and maintaining connections thereto.

It is a further object of the invention herein to increase the flexibility of replacing failed capacitors with capacitors incorporating multiple capacitance values by utilizing a range of tolerances in selecting the multiple capacitance values provided.

It is another principal object of the invention herein to provide a capacitor for replacing any one of a plurality of failed capacitors having different capacitance values and to meet or exceed the ratings and safety features of the failed capacitor.

In carrying out the invention herein, a replacement capacitor is provided having a plurality of selectable capacitance values. A capacitive element has a plurality of capacitor sections, each having a capacitance value. Each capacitor section has a section terminal and the capacitor sections have a capacitive element common terminal. The capacitive element is received in a case together with an insulating fluid at least partially and preferably substantially surrounding the capacitive element. The case is provided with a pressure interrupter cover assembly, including a cover having a common cover terminal and a plurality of section cover terminals thereon. The section terminals of the capacitive element are respectively connected to the section cover terminals and the common terminal of the capacitive element is connected to the common cover terminal, with the pressure interrupter cover assembly adapted to break one or more connections as required to disconnect the capacitive element from an electrical circuit in the event that the capacitive element has a catastrophic pressure-event failure. The replacement capacitor is connected into an electrical circuit to replace a failed capacitor by connections to selected ones of the common cover terminal and section cover terminals, the capacitor sections and connections being selected to provide one or more capacitance values corresponding to the capacitor being replaced. Such connections may include connecting capacitor sections in parallel, connecting capacitor sections in series, connecting capacitor sections in combinations of parallel and series, and connecting one or more capacitor sections separately to provide two or more independent capacitance values.

In one preferred aspect of the invention, the capacitive element is a wound cylindrical capacitive element having a plurality of concentric wound capacitor sections, each having a capacitance value. The number of capacitor sections is preferably six, but may be four or five, or may be greater than six. The capacitor section with the largest capacitance value is one of the outer three sections of the capacitive element. The capacitor sections are separated by insulation barriers and a metallic spray is applied to the ends of the capacitor sections. The insulation barriers withstand heat associated with connecting wire conductors to the capacitor sections.

The case is preferably cylindrical, having a cylindrical side wall, a bottom wall and an open top, to accommodate the wound cylindrical capacitive element.

Also, according to preferred aspects of the invention, the pressure interrupter cover assembly includes a deformable circular cover having a peripheral edge sealingly secured to the upper end of the case. The common cover terminal and section cover terminals are mounted to the cover at spaced apart locations thereon, and have terminal posts extending downwardly from the cover to a distal end. A rigid disconnect plate is supported under the cover and defines openings therethrough accommodating the terminal posts and exposing the distal ends thereof. Conductors connect the capacitor section terminals and the common element terminal to the distal ends of the respective terminal posts of the section cover terminals and common cover terminal. The conductor connections at the distal ends of the terminal posts are broken upon outward deformation of the cover. In more specific aspects, the conductors connecting the capacitor sections to the distal ends of the section cover terminal posts are insulated wires, with the ends soldered to foil tabs that are welded or soldered to the distal ends of the terminal posts adjacent the disconnect plate.

Also, according to aspects of the invention herein, the common cover terminal is positioned generally centrally on the cover, and the section cover terminals are positioned at spaced apart locations surrounding the common cover terminal. The section cover terminals include at least one blade connector, and preferably two or more blade connectors extending outwardly from the cover for receiving mating connectors for connecting selected ones of the capacitor sections into an electrical circuit. The common cover terminal preferably has four blade connectors.

Additional aspects of the invention include providing means insulating the section and common cover terminals, the insulating means including cylindrical cups upstanding from the cover, with the cylindrical cup of at least the common cover terminal extending to or above the blades thereof. According to a preferred aspect of the invention, the insulation means includes a cover insulation barrier having a barrier cup upstanding from the cover and substantially surrounding a central common cover terminal and further having barrier fins radially extending from the barrier cup and deployed between adjacent section cover terminals.

The invention herein is carried out by connecting one or more capacitor sections into an electrical circuit, by attaching leads to the cover terminals. This includes connecting capacitor sections in parallel, connecting capacitor sections in series, connecting individual capacitor sections, or connecting capacitor sections in combinations of parallel and series, as required to match the capacitance value or values of the failed capacitor being replaced. The capacitor sections can be connected to replace multiple capacitor values, as required, to substitute the capacitor for the capacitor that has failed.

In another aspect of the invention, the capacitance values of the capacitor sections are varied within a tolerance range from a stated value, such that one capacitor section may be utilized effectively to replace one of two values, either individually or in combinations of capacitor sections.

Other and more specific objects and features of the invention herein will, in part, be understood by those skilled in the art and will, in part, appear in the following description of the preferred embodiments, and claims, taken together with the drawings.

BRIEF DESCRIPTION OF DRAWINGS

FIG. 19 is a chart showing the single value capacitance values that may be provided by the capacitor of FIG. 1;

FIG. 20 is a chart showing dual value capacitances that may be provided by the capacitor of FIG. 1;

FIG. 21 is another chart showing dual value capacitances that may be provided by the capacitor of FIG. 1;

FIG. 22 is another chart showing dual value capacitances that may be provided by the capacitor of FIG. 1;

FIG. 23 is another chart showing dual value capacitances that may be provided by the capacitor of FIG. 1.

The same reference numerals refer to the same elements throughout the various Figures.

DETAILED DESCRIPTION OF THE INVENTION

Figure 1:
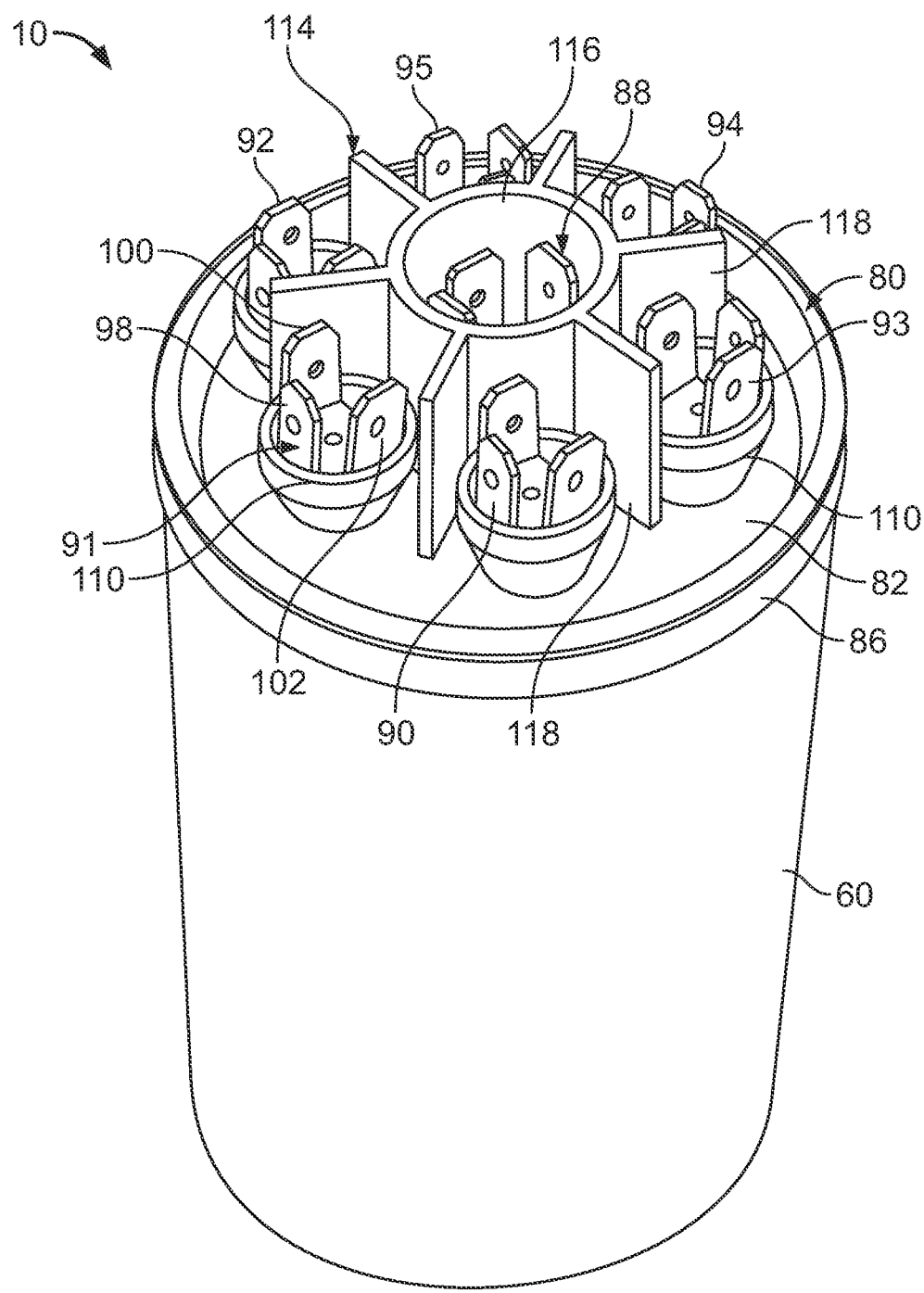
FIG. 1 is a perspective view of a capacitor according to the invention herein.
Figure 2:
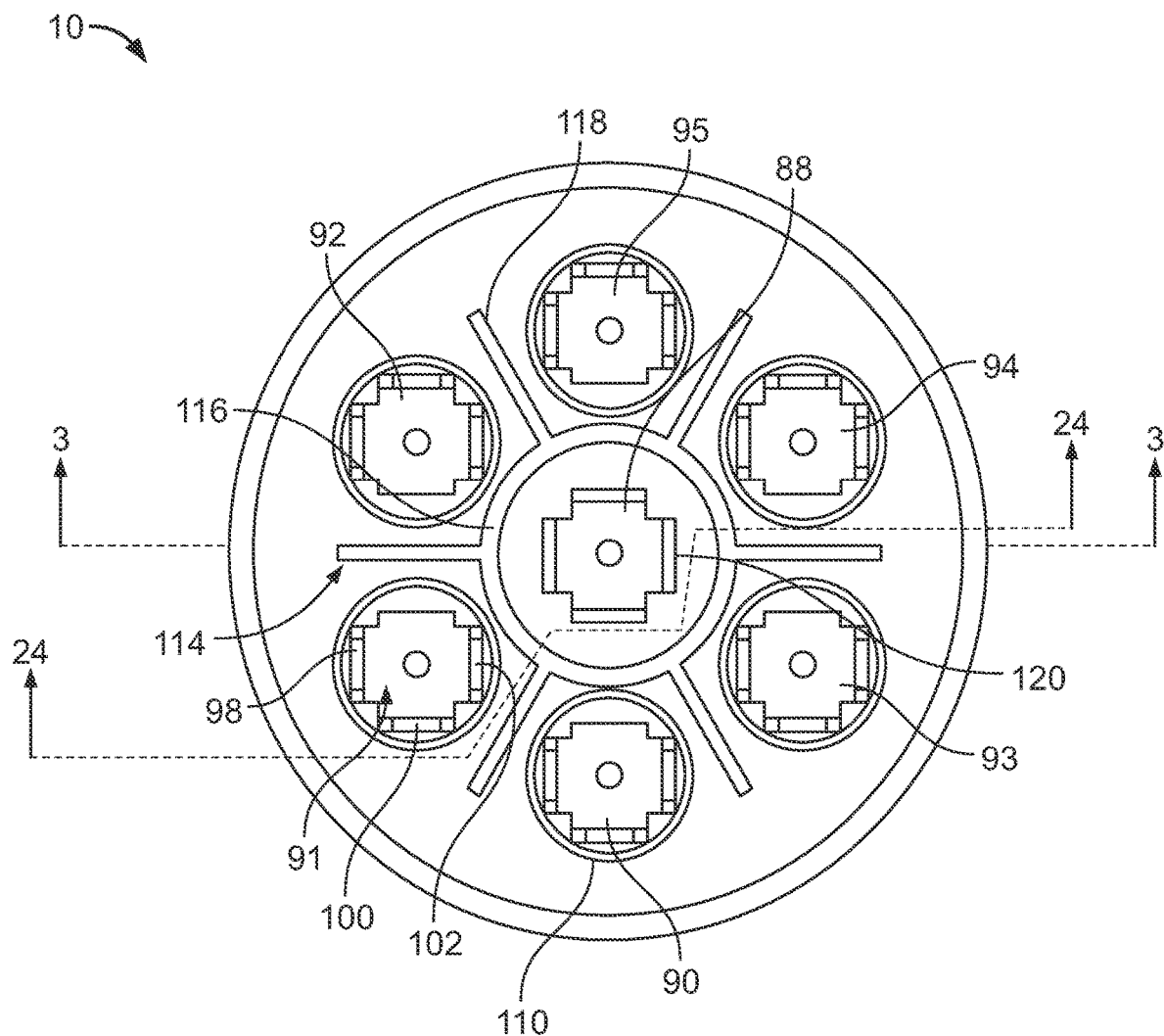
FIG. 2 is a top view of the capacitor of FIG. 1.
Figure 3:
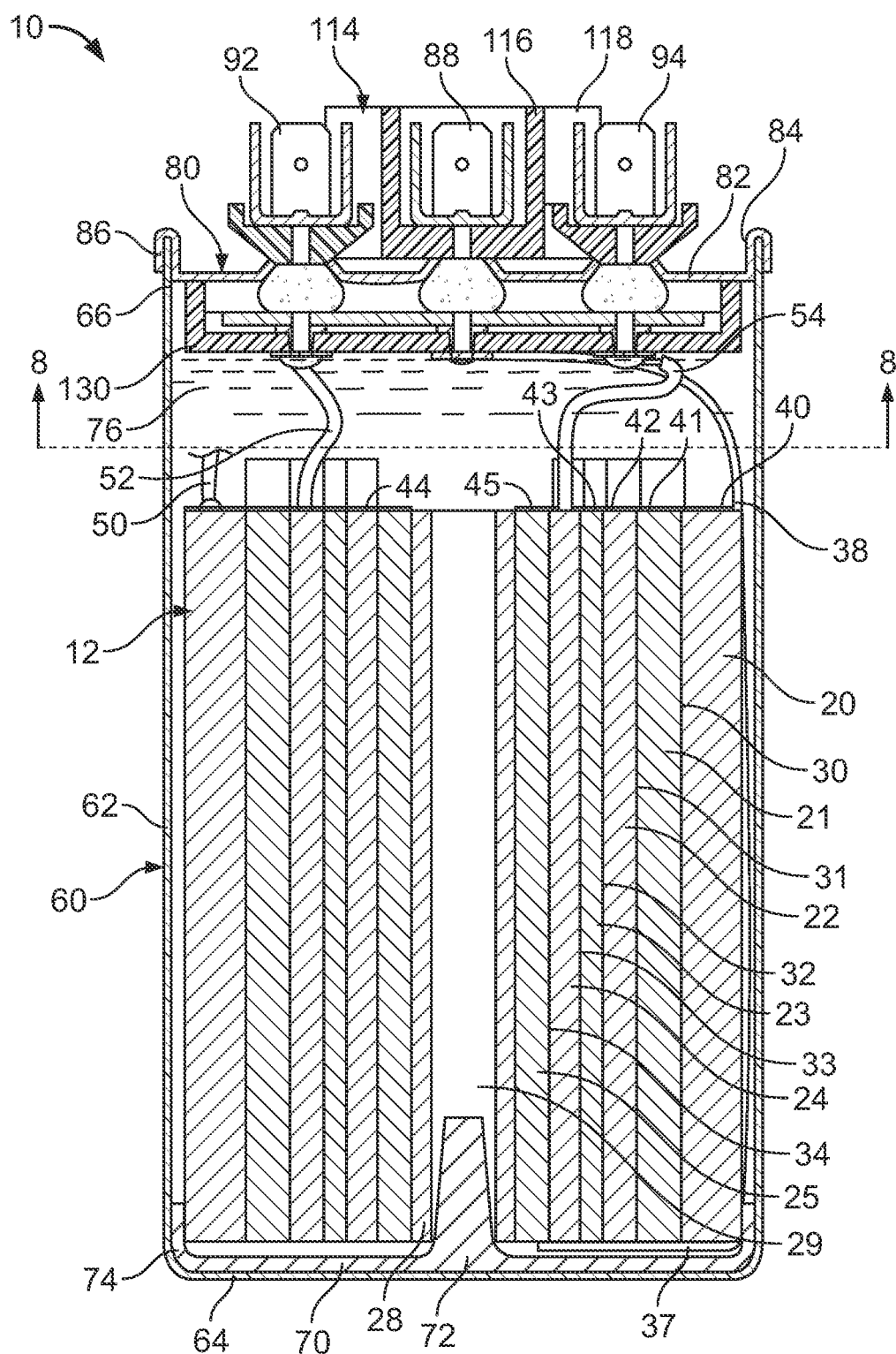
FIG. 3 is a sectional view of the capacitor of FIG. 1, taken along the lines 3-3 of FIG. 2.

A capacitor 10 is shown in FIGS. 1-3, as well as in other Figures to be described below. The capacitor 10 is adapted to replace any one of a large number of capacitors. Therefore, a serviceman may carry a capacitor 10 on a service call and, upon encountering a failed capacitor, the serviceman can utilize the capacitor 10 to replace the failed capacitor with the capacitor 10 being connected to provide the same capacitance value or values of the failed capacitor.

Figure 4:
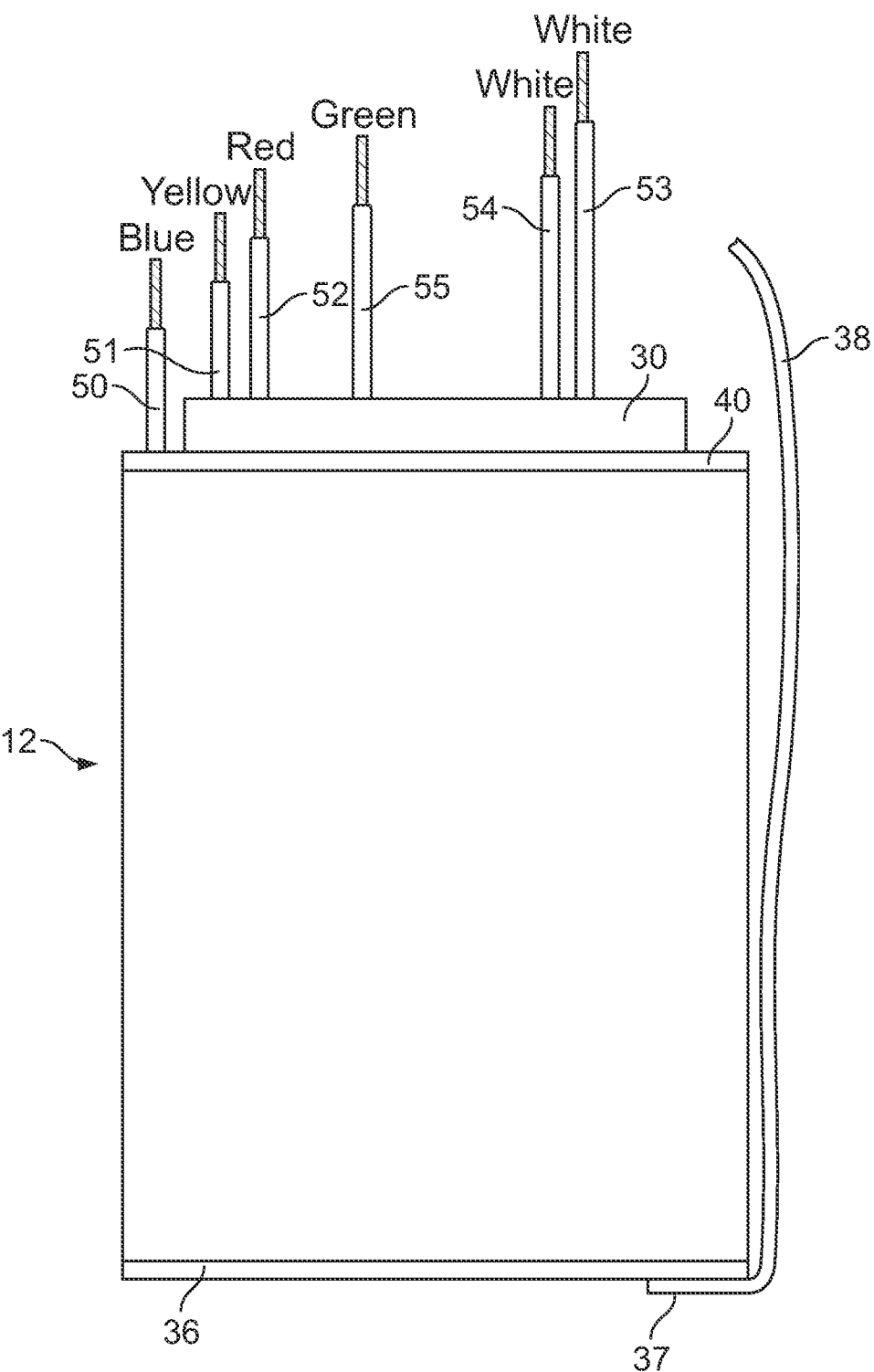
FIG. 4 is a side elevation view of the capacitive element of the capacitor of FIG. 1, including wire conductors connected to the capacitor sections thereof.
Figure 5:
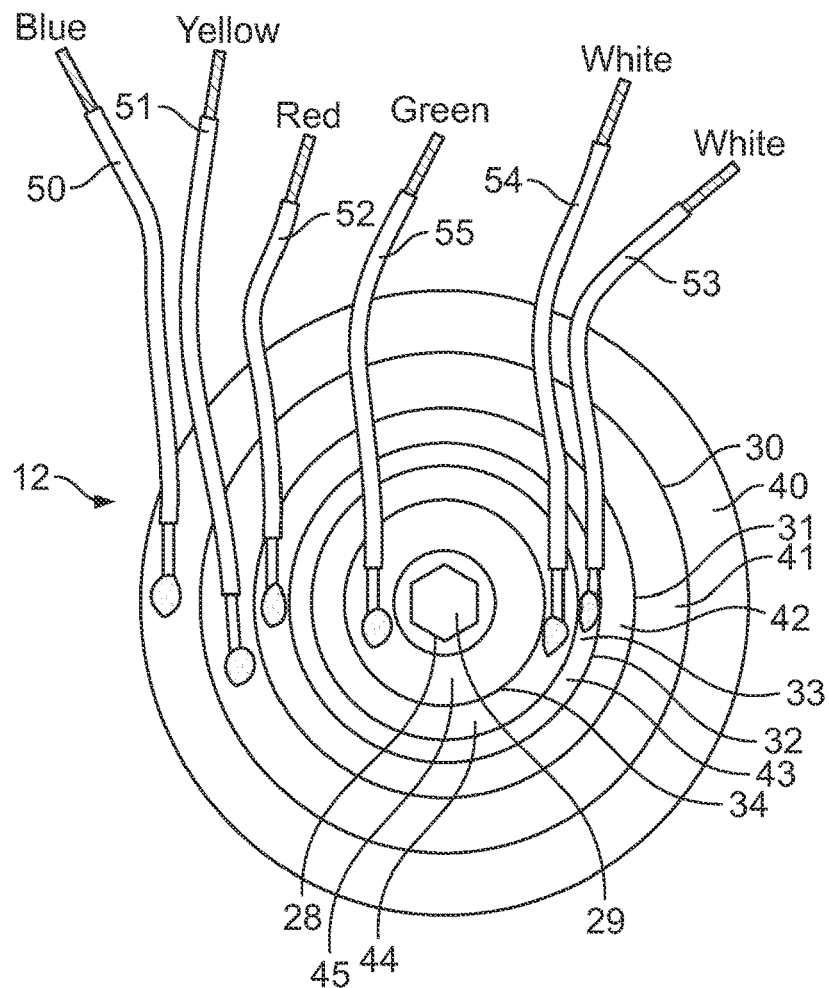
FIG. 5 is a top view of the capacitive element of the capacitor of FIG. 1, including wire conductors connected to capacitor sections thereof.

The capacitor 10 has a capacitive element 12 having a plurality of capacitor sections, each having a capacitance value. The capacitive element 12 is also shown in FIGS. 4 and 5. In the preferred embodiment described herein, the capacitive element 12 has six capacitor sections 20-25. The capacitive element 12 is a wound cylindrical element manufactured by extension of the techniques described in my prior U.S. Pat. Nos. 3,921,041, 4,028,595, 4,352,145 and 5,313,360, incorporated herein by reference. Those patents relate to capacitive elements having two capacitor sections rather than a larger plurality of capacitor sections, such as the six capacitor sections 20-25 of the capacitive element 12. Accordingly, the capacitive element 12 has a central spool or mandrel 28, which has a central opening 29. First and second dielectric films, each having a metalized layer on one side thereof, are wound in cylindrical form on the mandrel 28 with the nonmetalized side of one film being in contact with the metalized side of the other. Selected portions of one or both of the metalized layers are removed in order to provide a multiple section capacitor. Element insulation barriers are inserted into the winding to separate the capacitor sections, the element insulation barriers also assuming a cylindrical configuration. Five element insulation barriers 30-34 are provided to separate the six capacitor sections 20-25, with element insulation barrier 30 separating capacitor sections 20 and 21, element insulation barrier 31 separating capacitor sections 21 and 22, element insulation barrier 32 separating capacitor sections 22 and 23, element insulation barrier 33 separating capacitor sections 23 and 24, and element insulation barrier 34 separating capacitor sections 24 and 25. The element insulation barriers are insulating polymer sheet material, which in the capacitive element 12 is polypropylene having a thickness of 0.005 inches, wound into the capacitive element 12. Thickness of 0.0025 to 0.007 may be used. Other materials may also be used. The barriers each have about 2%-4 wraps of the polypropylene sheet material, wherein the element insulation barriers have a thickness of about 0.013 to 0.020 inches. The barriers 30-34 are thicker than used before in capacitors with fewer capacitor sections. The important characteristic of the barriers 30-34 is that they are able to withstand heat from adjacent soldering without losing integrity of electrical insulation, such that adjacent sections can become bridged.

As is known in the art, the metalized films each have one unmetalized marginal edge, such that the metalized marginal edge of one film is exposed at one end of the wound capacitive element 12 and the metalized marginal edge of the other film is exposed at the other end of the capacitive element 12. With reference to FIGS. 3 and 5, at the lower end of the capacitance element 12, the barriers 30-34 do not extend from the film, and an element common terminal 36 is established contacting the exposed metalized marginal edges of one metalized film of all the capacitor sections 20-25. The element common terminal 36 is preferably a zinc spray applied onto the end of the capacitive element 12.

At the top end of the capacitive element 12 as depicted in FIGS. 3 and 5, the element insulation barriers 30-34 extend above the wound metalized film. An individual capacitor element section terminal is provided for each of the capacitive sections 20-25, also by applying a zinc or other metallic spray onto the end of the capacitive element 12 with the zinc being deployed on each of the capacitor sections 20-25 between and adjacent the element insulation barriers 30-34. The element section terminals are identified by numerals 40-45. Element section terminal 40 of capacitor section 20 extends from the outer-most element insulation barrier 30 to the outer surface of the capacitive element 12, and the element section terminal 45 of capacitor section 25 extends from the inner-most element insulation barrier 34 to the central mandrel 28. Element section terminals 41-44 are respectively deployed on the capacitor sections 21-24.

Conductors preferably in the form of six insulated wires 50-55 each have one of their ends respectively soldered to the element section terminals 40-45, as best seen in FIG. 5. The thickness of the polypropylene barriers 30-34 resists any burn-through as a result of the soldering to connect wires 50-55 to the terminals 40-45.

The insulation of the wires 50-55 is color coded to facilitate identifying which wire is connected to which capacitor section. Wire 50 connected to element section terminal 40 of capacitor section 20 has blue insulation, wire 51 connected to element section terminal 41 of capacitor section 21 has yellow insulation, wire 52 connected to element section terminal 42 of capacitor section 22 has red insulation, wire 53 connected to element section terminal 43 of capacitor section 23 has white insulation, wire 54 connection to element section terminal 44 of capacitor section 24 has white insulation, and wire 55 connected to element section terminal 45 of capacitor section 25 has green insulation. These colors are indicated on FIG. 4.

The capacitive element 12 is further provided with foil strip conductor 38, having one end attached to the element common terminal 36 at 37. The foil strip conductor 38 is coated with insulation, except for the point of attachment 37 and the distal end 39 thereof. The conductor 50 connected to the outer capacitor element section 20 and its terminal 30 may also be a foil strip conductor. If desired, foil or wire conductors may be utilized for all connections.

In the capacitive element 12 used in the capacitor 10, the capacitor section 20 has a value of 25.0 microfarads and the capacitor section 21 has a capacitance of 20.0 microfarads. The capacitor section 22 has a capacitance of 10.0 microfarads. The capacitor section 23 has a capacitance of 5.5 microfarads, but is identified as having a capacitance of 5.0 microfarads for purposes further discussed below. The capacitor section 24 has a capacitance of 4.5 microfarads but is labeled as having a capacitance of 5 microfarads, again for purposes described below. The capacitor section 25 has a capacitance of 2.8 microfarads. The capacitor section 20 with the largest capacitance value also has the most metallic film, and is therefore advantageously located at the outer section or at least one of the three outer sections of the capacitive element 12.

The capacitor 10 also has a case 60, best seen in FIGS. 1-3, having a cylindrical side wall 62, a bottom wall 64, and an open top 66 of side wall 62. The case 60 is formed of aluminum and the cylindrical side wall 62 has an outside diameter of 2.50 inches. This is a very common diameter for capacitors of this type, wherein the capacitor 10 will be readily received in the mounting space and with the mounting hardware provided for the capacitor being replaced. Other diameters may, however, be used, and the case may also be plastic or of other suitable material.

The capacitive element 12 with the wires 50-55 and the foil strip 38 are received in the case 60 with the element common terminal 36 adjacent the bottom wall 64 of the case. An insulating bottom cup 70 is preferably provided for insulating the capacitive element from the bottom wall 64, the bottom cup 70 having a center post 72 that is received in the center opening 29 of the mandrel 28, and an up-turned skirt 74 that embraces the lower side wall of the cylindrical capacitive element 12 and spaces it from the side wall 62 of the case 60. An insulating fluid 76 is provided within the case 60, at least partly and preferably substantially surrounding the capacitive element 12. The fluid 76 may be the fluid described in my U.S. Pat. No. 6,014,308, incorporated herein by reference, or one of the other insulating fluids used in the trade, such as polybutene.

Figure 9:
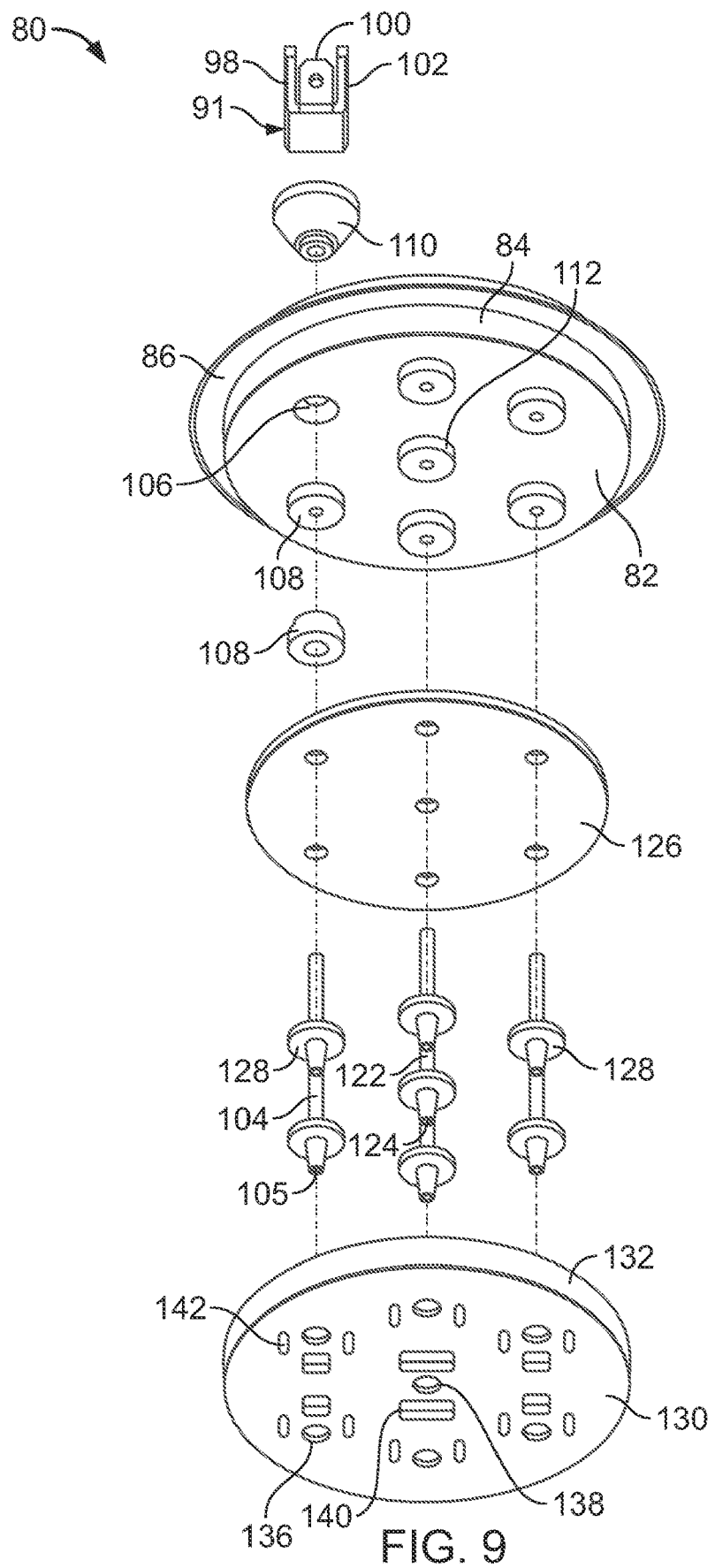
FIG. 9 is an exploded perspective view of the pressure interrupter cover assembly of the capacitor of FIG. 1.
Figure 10:
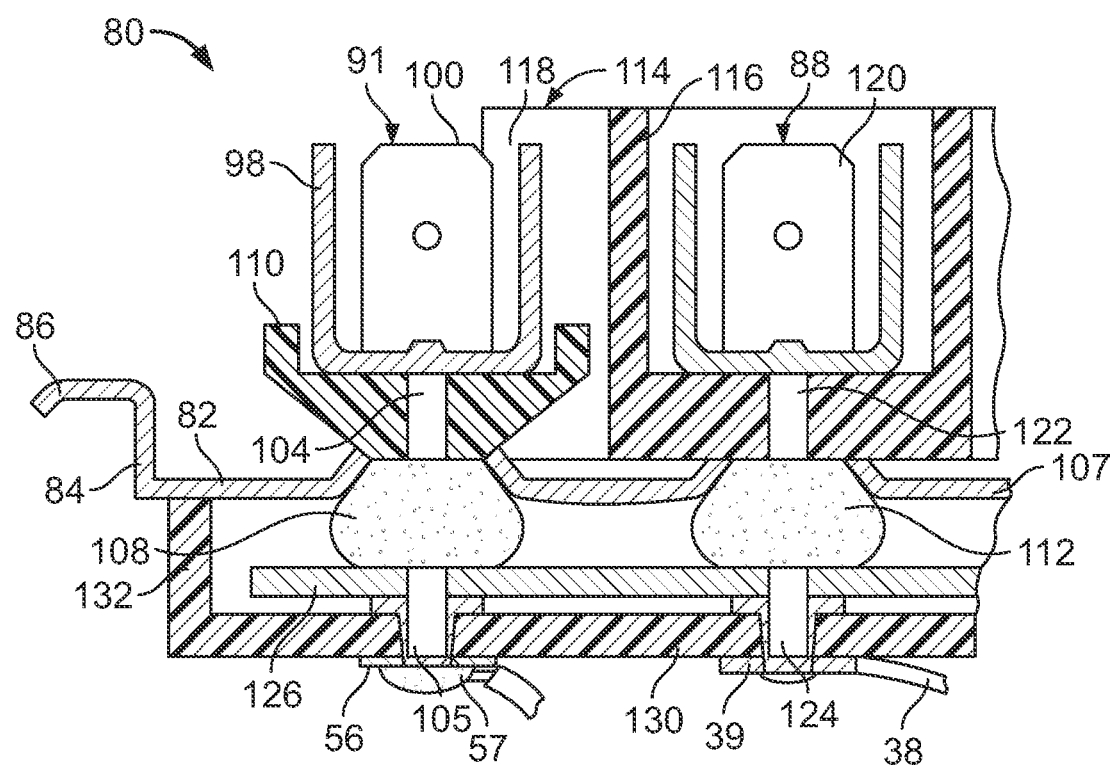
FIG. 10 is an enlarged fragmentary view of the pressure interrupter cover assembly of the capacitor of FIG. 1.

The capacitor 10 also has a pressure interrupter cover assembly 80 best seen in FIGS. 1-3, 8-10 and 24. The cover assembly 80 includes a deformable circular cover 82 having an upstanding cylindrical skirt 84 and a peripheral rim 86 as best seen in FIGS. 9 and 10. The skirt 84 fits into the open top 66 cylindrical side wall 62 of case 60, and the peripheral rim 86 is crimped to the open top 66 of the case 60 to seal the interior of the capacitor 10 and the fluid 76 contained therein, as shown in FIGS. 1 and 3.

The pressure interrupter cover assembly 80 includes seven cover terminals mounted on the deformable cover 82. A common cover terminal 88 is mounted generally centrally on the cover 82, and section cover terminals 90-95, each respectively corresponding to one of the capacitor sections 20-25, are mounted at spaced apart locations surrounding the common cover terminal 88. With particular reference to FIGS. 1, 2, 9 and 10, the section cover terminal 91 has three upstanding blades 98, 100 and 102 mounted on the upper end of a terminal post 104. Terminal post 104 has a distal end 105, opposite the blades 98, 100 and 102. The cover 82 has an opening 106 for accommodating the terminal post 104, and has a beveled lip 107 surrounding the opening. A shaped silicone insulator 108 fits snuggly under the cover in the beveled lip 107 and the terminal post 104 passes through the insulator 108. On the upper side of the cover, an insulator cup 110 also surrounds the post 104, and the insulator cup 110 sits atop the silicone insulator 108; thus, the terminal 91 and its terminal post 104 are well insulated from the cover 82. The other cover section terminals 92-95 are similarly mounted with an insulator cup and a silicone insulator.

The common cover terminal 88 has four blades 120, and a terminal post 122 that passes through a silicone insulator 112. The common cover terminal 88 mounts cover insulator barrier 114 that includes an elongated cylindrical center barrier cup 116 surrounding and extending above the blades 120 of the cover common terminal 88, and six barrier fins 118 that extend respectively radially outwardly from the elongated center barrier cup 116 such that they are deployed between adjacent section cover terminals 90-95. This provides additional protection against any arcing or bridging contact between adjacent section cover terminals or with the common cover terminal 88. Alternatively, the common cover terminal 88 may be provided with an insulator cup 116, preferably extending above blades 120 but with no separating barrier fins, although the barrier fins 118 are preferred. The terminal post 122 extends through an opening in the bottom of the base 117 of the insulating barrier cup 116, and through the silicone insulator 112, to a distal end 124.

The pressure interrupter cover assembly 80 has a fiberboard disc 126 through which the terminal posts 122, terminal post 104 and the terminal posts of the other section cover terminals extend. The disc 126 may be also fabricated of other suitable material, such as polymers. The terminal posts 104, 122, etc. are configured as rivets with rivet flanges 128 for assembly purposes. The terminal posts 104, 122, etc. are inserted through the disc 126, insulators 108, 112, insulator cups 110 and barrier cup 116, and the cover terminals 88, 90-95 are spot welded to the ends of the rivets opposite the rivet flanges 128. Thus, the rivet flanges 128 secure the cover terminals 88, 90-95 in the cover 82, together with the insulator barrier 114, insulator cups 110 and silicone insulators 108, 112. The fiberboard disc 126 facilitates this assembly, but may be omitted, if desired. The distal ends of the terminal posts are preferably exposed below the rivet flanges 128.

The cover assembly 80 has a disconnect plate 130, perhaps best seen in FIGS. 3, 9 and 10. The disconnect plate 130 is made of a rigid insulating material, such as a phenolic, is spaced below the cover 82 by a spacer 134 in the form of a skirt. The disconnect plate 130 is provided with openings accommodating the distal ends of the terminal posts, such as opening 136 accommodating the distal end 105 of terminal post 104 and opening 138 accommodating the distal end 124 of the terminal post 122. With particular reference to FIG. 9, the disconnect plate 130 may be provided with raised guides, such as linear guides 140 and dimple guides 142, generally adjacent the openings accommodating the distal ends of terminal posts. These guides are for positioning purposes as discussed below.

In prior capacitors having three or fewer capacitor sections, the conductors between the capacitor sections and the terminal posts were generally foil strips, such as the one used for the common terminal 36 of the capacitive element 12 herein. The foil strips were positioned on a breaker plate over the distal ends of terminal posts, and were welded to the distal ends of the terminal posts. In capacitor 10, the distal end 39 of the foil strip 38 is connected to the distal end 124 of terminal post 122 by welding, as in prior capacitors.

Figure 6:
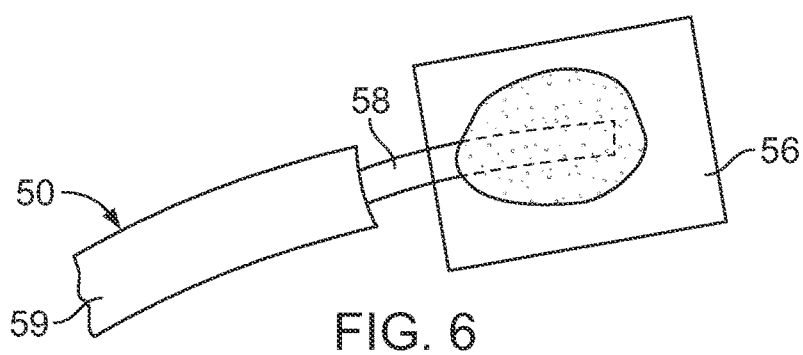
FIG. 6 is an enlarged fragmentary plan view of a distal end of a wire conductor of FIGS. 4 and 5, connected to a foil tab.
Figure 7:
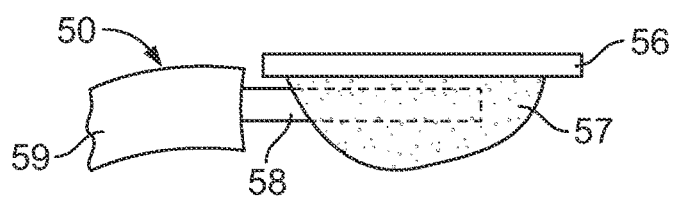
FIG. 7 is an enlarged fragmentary side view of a distal end of a wire conductor of FIGS. 4 and 5, connected to a foil tab.
Figure 8:
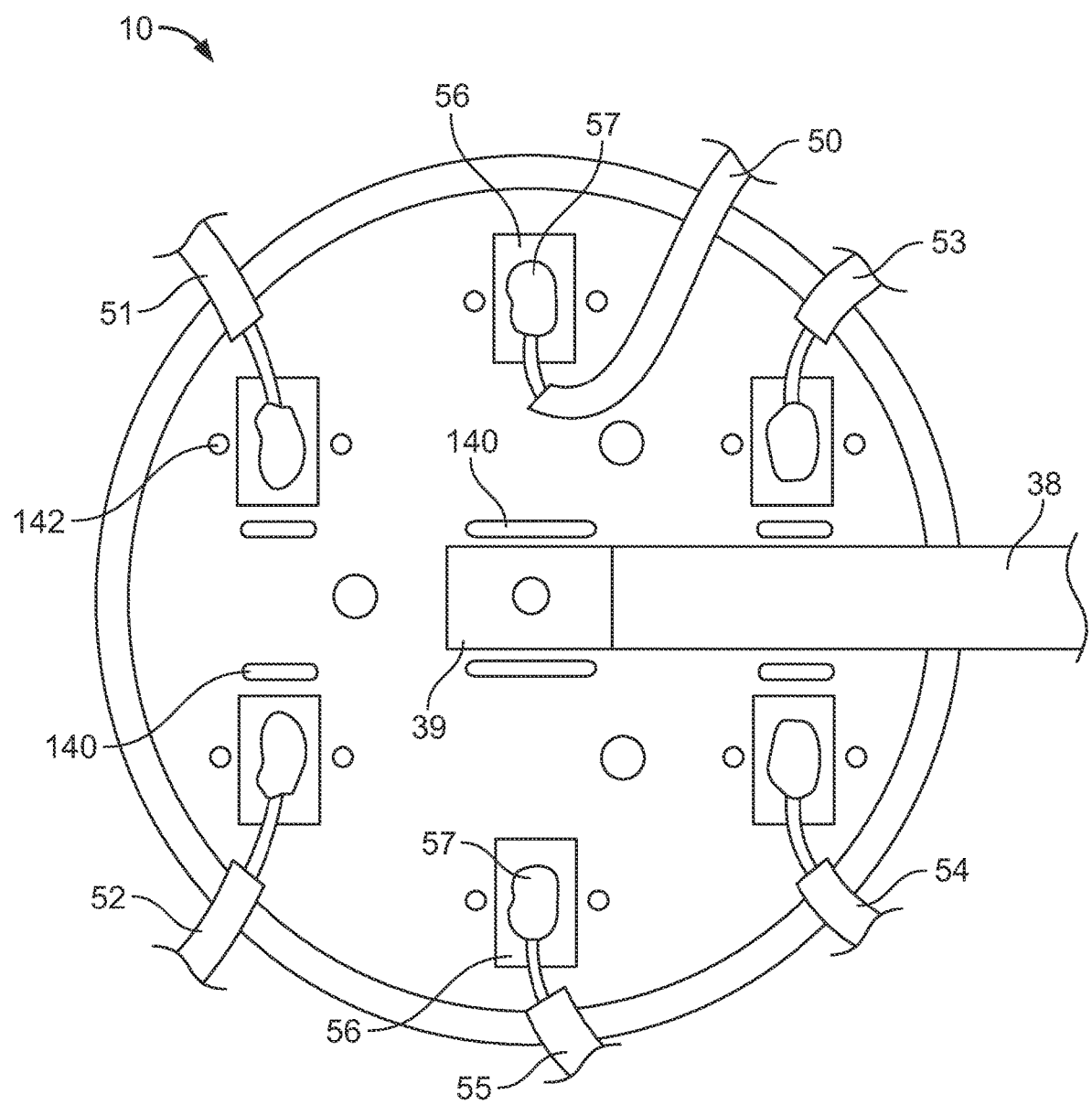
FIG. 8 is a sectional view of the capacitor of FIG. 1 taken along the lines 8-8 of FIG. 3, and showing a pressure interrupter cover assembly of the capacitor of FIG.1.

The wires 50-55 are not well-configured for welding to the distal ends of the terminal posts of the cover section terminals. However, the wires 50-55 are desirable in place of foil strips because they are better accommodated in the case 60 and have good insulating properties, resist nicking and are readily available with colored insulations. In order to make the necessary connection of the wires 50-55 to their respective terminal posts, foil tabs 56 are welded to each of the distal ends of the terminal posts of the section cover terminals 90-95, and the guides 140, 142 are helpful in positioning the foil tabs 56 for the welding procedure. The attachment may be accomplished by welding the distal end of a foil strip to the terminal post, and then cutting the foil strip to leave the foil tab 56. Thereafter, and as best seen in FIGS. 6, 7 and 10, the conductor 58 of wire 50 is soldered to the tab 56, by solder 57. The insulation 59 of wire 50 has been stripped to expose the conductor 58. The other wires 51-55 are similarly connected to their respective cover section terminals. Alternatively, the foil tabs may be soldered to the wires and the tabs may then be welded to the terminal posts, if desired, or other conductive attachment may be employed.

Accordingly, each of the capacitor sections 20-25 is connected to a corresponding section cover terminal 90-95 by a respective one of color coded wires 50-55. The insulator cups 110 associated with each of the section cover terminals 90-95 are also color coded, using the same color scheme as used in the wires 50-55. This facilitates assembly, in that each capacitor section and its wire conductor are readily associated with the correct corresponding section cover terminal, so that the correct capacitor sections can be identified on the cover to make the desired connections for establishing a selected capacitance value.

The connections of the wires 50-55 and the foil 38 to the terminal posts is made prior to placing the capacitive element 12 in the case 60, adding the insulating fluid 76, and sealing the cover 82 of cover assembly 80 to the case 60. The case 60 may be labeled with the capacitance values of the capacitance sections 20-25 adjacent the cover terminals, such as on the side of case 60 near the cover 82 or on the cover 82.

The capacitor 10 may be used to replace a failed capacitor of any one of over two hundred different capacitance values, including both single and dual applications. Therefore, a serviceman is able to replace virtually any failed capacitor he may encounter as he makes service calls on equipment of various manufacturers, models, ages and the like.

As noted above, the capacitor 10 is expected to be used most widely in servicing air conditioning units. Air conditioning units typically have two capacitors; a capacitor for the compressor motor which may or may not be of relatively high capacitance value and a capacitor of relatively low capacitance value for a fan motor. The compressor motor capacitors typically have capacitances of from 20 to about 60 microfarads. The fan motor capacitors typically have capacitance values from about 2.5 to 12.5 microfarads, and sometimes as high as 15 microfarads, although values at the lower end of the range are most common.

Figure 11:
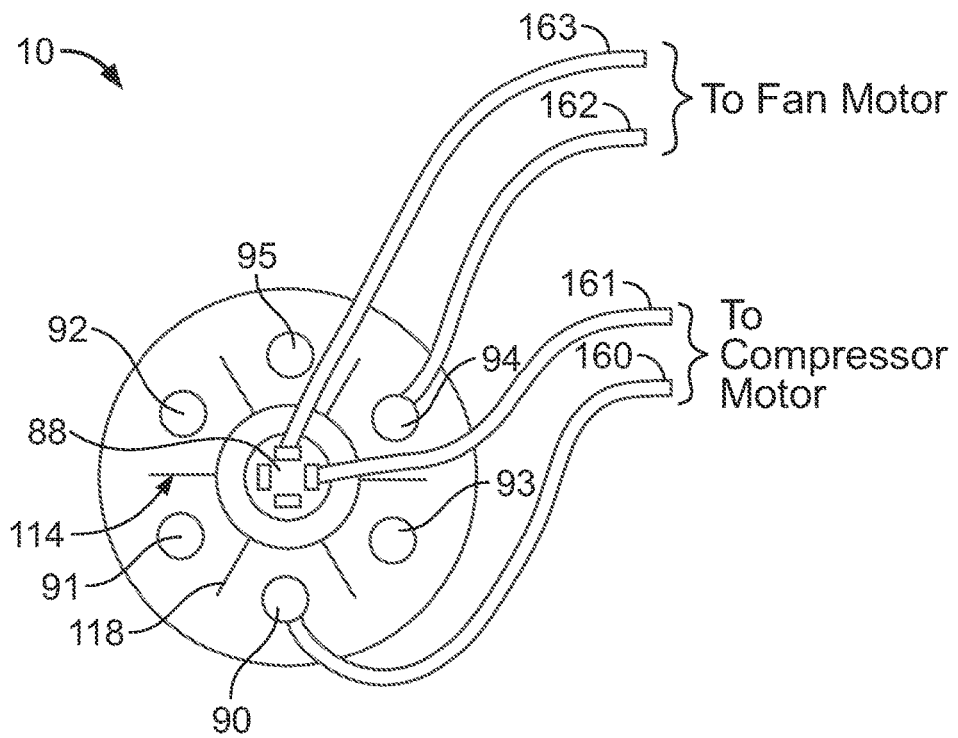
FIG. 11 is a top view of the capacitor of FIG. 1, shown with selected capacitor sections connected to a fan motor and a compressor motor.
Figure 12:
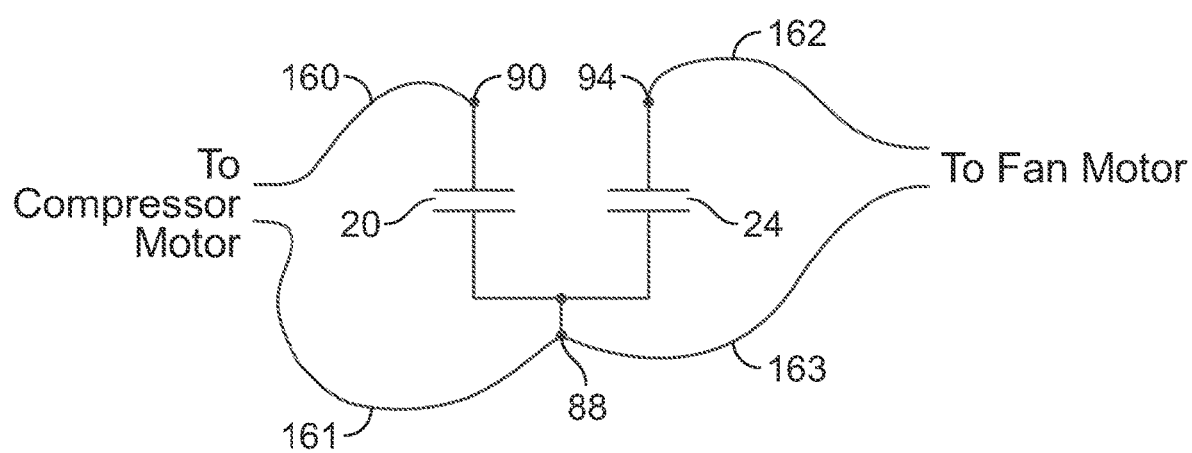
FIG. 12 is a schematic circuit diagram of the capacitor of FIG. 1 connected as shown in FIG. 11.

With reference to FIG. 11, capacitor 10 is connected to replace a compressor motor capacitor and a fan motor capacitor, where the compressor motor capacitor has a value of 25.0 microfarads and the fan motor capacitor has a value of 4.0 microfarads. The 25.0 microfarad replacement capacitance for the compressor motor is made by one of the compressor motor leads 160 being connected to one of the blades of the blue section cover terminal 90 of capacitance section 20, which has a capacitance value of 25.0 microfarads, and the other compressor motor lead 161 being connected to one of the blades 120 of common cover terminal 88. The lead 162 from the fan motor is connected to the white section cover terminal 94 of capacitor section 24, and the second lead 163 from the fan motor is also connected to the common cover terminal 88. As set forth above, the actual capacitance value of the capacitor section 24 that is connected to the section cover terminal 94 is 4.5 microfarads, and the instructions and/or labeling for the capacitor 10 indicate that the capacitor section 24 as represented at terminal 94 should be used for a 4.0 microfarad replacement. Preferred labeling for this purpose can be "5.0 (4.0) microfarads" or similar. The 4.5 microfarad capacitance value is within approximately 10% of the specified 4.0 microfarad value, and that is within acceptable tolerances for proper operation of the fan motor. Of course, the capacitor section 24 and terminal 94 may be connected to replace a 5.0 microfarad capacitance value as well, whereby the 4.5 microfarad actual capacitance value of capacitor section 24 gives added flexibility in replacing failed capacitors. Similarly, the 5.5 microfarad capacitor section 23 can be used for either 5.0 microfarad or 6.0 microfarad replacement, and the 2.8 microfarad section 25 can be used for a 3.0 microfarad replacement or for a 2.5 microfarad additive value. FIG. 12 schematically illustrates the connection of capacitor sections 20 and 24 to the compressor motor and fan motor shown in FIG. 11.

Figure 13:
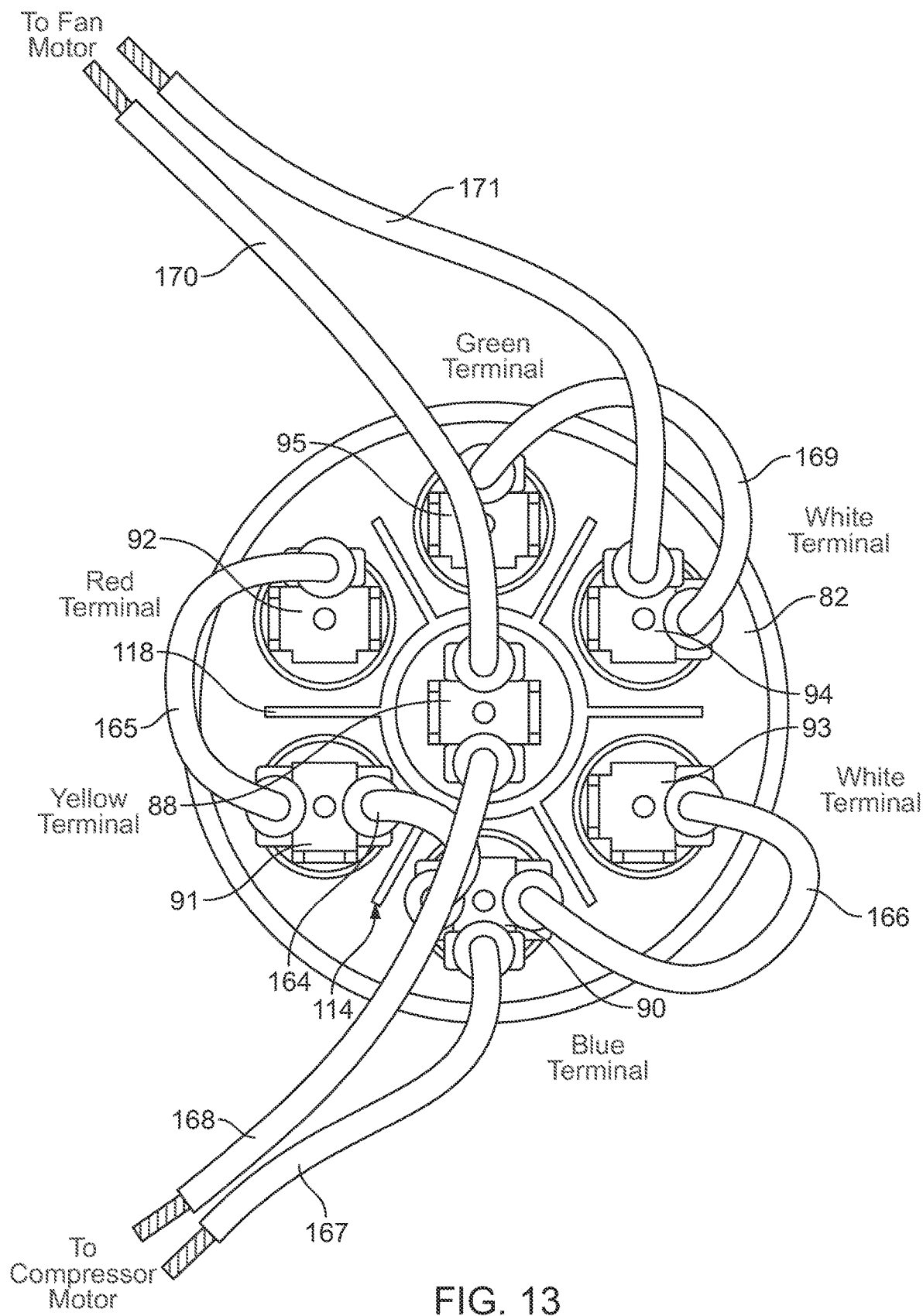
FIG. 13 is a top view of the capacitor of FIG. 1 with jumper wires connecting selected capacitor sections in parallel, and also shown connected in an electrical circuit to a fan motor and a compressor motor.

FIG. 13 illustrates another connection of the capacitor 10 for replacing a 60.0 microfarad compressor motor capacitor and a 7.5 microfarad fan motor capacitor. The formula for the total capacitance value for capacitors connected in parallel is additive namely: $C_t = C_1 + C_2 + C_3 \ldots$ Therefore, with reference to FIG. 13, a 60.0 microfarad capacitance value for the compressor motor is achieved by connecting in parallel the section cover terminal 90 (capacitor section 20 at a value of 25.0 microfarads), section cover terminal 91 (capacitor section 21 at a value of 20.0 microfarads), section cover terminal 92 (capacitor section 22 at a value of 10.0 microfarads) and section cover terminal 93 (capacitor section 23 at a nominal value of 5.0 microfarads). The foregoing connections are made by means of jumpers 164, 165 and 166, which may be supplied with the capacitor 10. Lead 167 is connected from the section cover terminal 90 of the capacitor section 20 to the compressor motor, and lead 168 is connected from the common cover terminal 88 to the compressor motor. This has the effect of connecting the specified capacitor sections 20, 21, 22 and 23 in parallel, giving a total of 60.0 microfarad capacitance; to wit: 25+20+ 10+5=60. It is preferred but not required to connect the lead from the compressor motor or the fan motor to the highest value capacitor section used in providing the total capacitance.

Figure 14:
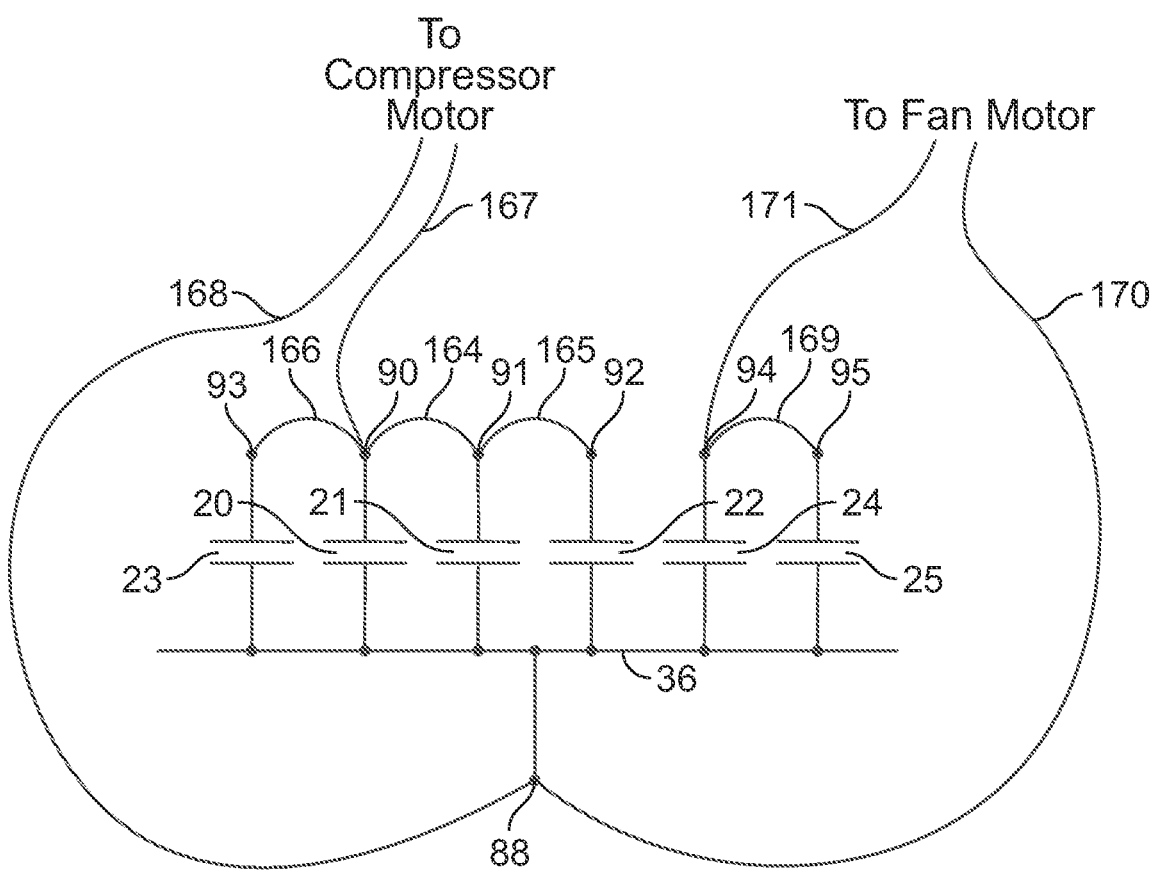
FIG. 14 is a schematic circuit diagram of the capacitor of FIG. 1 connected as shown in FIG. 13.

Similarly, a 7.5 microfarad capacitance is provided to the fan motor by connecting section cover terminal 94 of the 5.0 microfarad capacitor section 24 and the section cover terminal 95 of the nominal 2.5 microfarad capacitor section 25 in parallel via jumper 169. Leads 170 and 171 connect the fan motor to the common cover terminal 88 and the section cover terminal 95 of the capacitor section 25. FIG. 14 diagrammatically illustrates the connection of the capacitor 10 shown in FIG. 13.

It will be appreciated that various other jumper connections between section cover terminals can be utilized to connect selected capacitor sections in parallel, in order to provide a wide variety of capacitance replacement values.

The capacitor sections can also be connected in series to utilize capacitor 10 as a single value replacement capacitor. This has the added advantage of increasing the voltage rating of the capacitor 10 in a series application, i.e. the capacitor 10 can safely operate at higher voltages when its sections are connected in series. As a practical matter, the operating voltage will not be increased as it is established by the existing equipment and circuit, and the increased voltage rating derived from a series connection will increase the life of the capacitor 10 because it will be operating well below its maximum rating.

Figure 15:
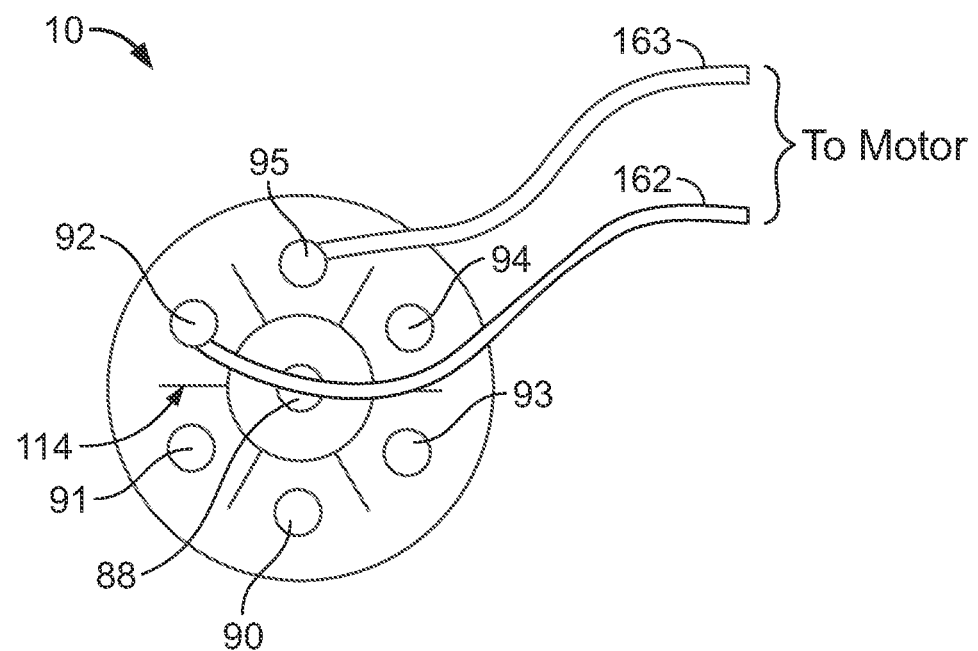
FIG. 15 is a top view of the capacitor of FIG. 1 connecting selected capacitor sections in series, and also shown connected in an electrical circuit to a motor.
Figure 16:
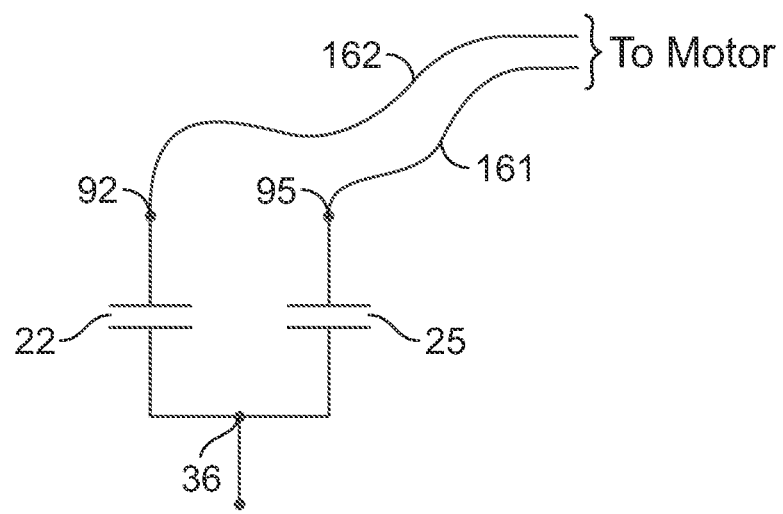
FIG. 16 is a schematic circuit diagram of the capacitor of FIG. 1 as connected shown in FIG. 15.

With reference to FIG. 15, the capacitor 10 is shown with capacitor section 22 (terminal 92) having a value of 10.0 microfarads connected in series with capacitor section 25 (terminal 95) having a nominal value of 2.5 microfarads to provide a replacement capacitance value of 2.0 microfarads. Leads 175 and 176 make the connections from the respective section cover terminals 92 and 95 to the motor, and the element common terminal 36 connects the capacitor sections 22 and 25 of capacitive element 12. With reference to FIG. 16, the connection of capacitor 10 shown in FIG. 15 is illustrated diagrammatically. In both FIGS. 15 and 16, it will be seen that the cover common terminal 88 is not used in making series connections.

The formula for capacitance of capacitors connected in series is:

$$\frac{1}{C_T} = \frac{1}{C_1} + \frac{1}{C_2} + \frac{1}{C_3}\ldots$$

Therefore, $$C_T = \frac{C_1 \times C_2}{C_1 + C_2},$$

and the total capacitance of the capacitor sections 22 and 25 connected as shown in FIGS. 15 and 16 is $$C_T = \frac{10.0 \times 2.5}{10.0 + 2.5} = \frac{25}{12.5} = 2.0 \text{ microfarads}$$

The capacitance of each of the capacitor sections 20-25 is rated at 440 volts. However, when two or more capacitor sections 20-25 are connected in series, the applied voltage section is divided between the capacitor sections in inverse proportion to their value. Thus, in the series connection of FIGS. 15 and 16, the nominal 2.5 microfarad section sees about 80% of the applied voltage and the 10.0 microfarad section sees about 20% of the applied voltage. The net effect is that the capacitor 10 provides the 2.0 microfarad replacement value at a higher rating, due to the series connection. In this configuration, the capacitor 10 is lightly stressed and is apt to have an extremely long life.

Figure 17:
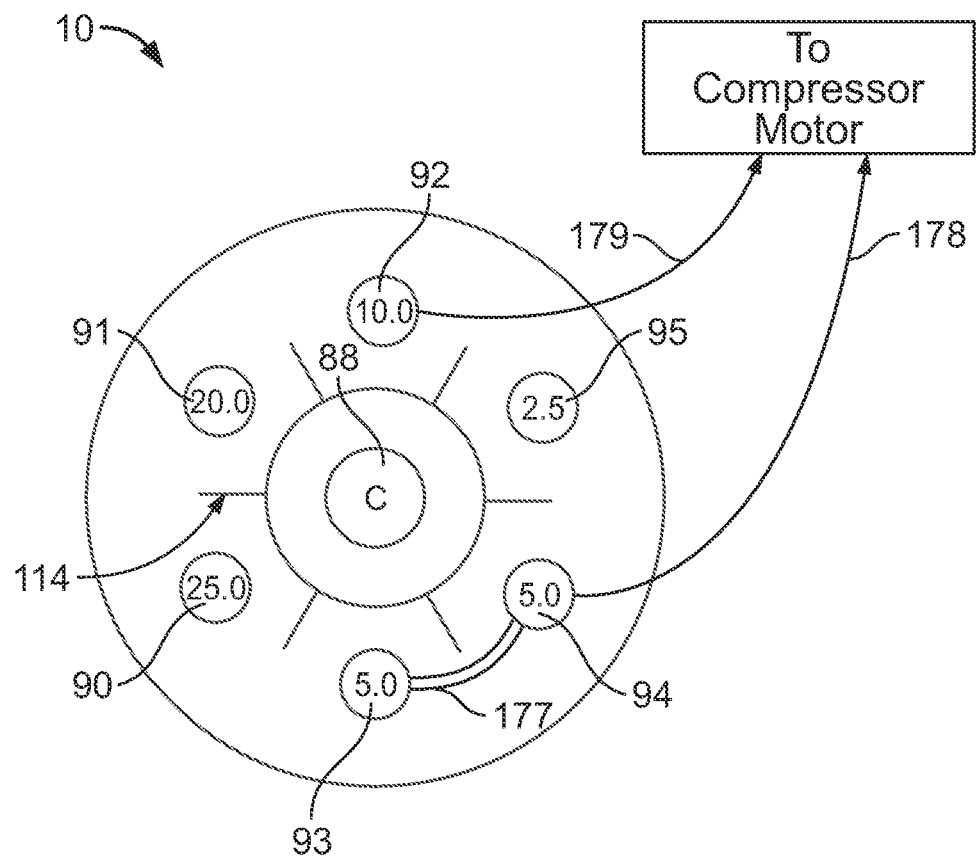
FIG. 17 is a top view of the capacitor of FIG. 1 with a jumper wire connecting selected capacitor sections in series, and also shown connected in an electrical circuit to a compressor motor.

With reference to FIG. 17, the capacitor sections of the capacitor 10 are shown connected in a combination of parallel and series connections to provide additional capacitive values at high voltage ratings, in this case 5.0 microfarads. The two capacitor sections 23 and 24 each having a nominal value of 5.0 microfarads are connected in parallel by jumper 177 between their respective cover section terminals 93 and 94. The leads 178 and 179 from a compressor motor are connected to the section cover terminal 92 of capacitor section 22 having a value of 10.0 microfarads, and the other lead is connected to cover section terminal 94 of capacitor section 24. Thus, a capacitance value of 5.0 microfarads is provided according to the following $$\frac{1}{C_T} = \frac{1}{C_1} + \frac{1}{C_2}$$

where $C_1$ is a parallel connection having the value C+C, in this case 5.0+5.0 for a $C_1$ of 10.0 microfarads. With that substitution, the total value is $$C_T = \frac{10.0 \times 10.0}{10 + 10} = \frac{100}{20} = 5.0 \text{ microfarads}$$

Figure 18:
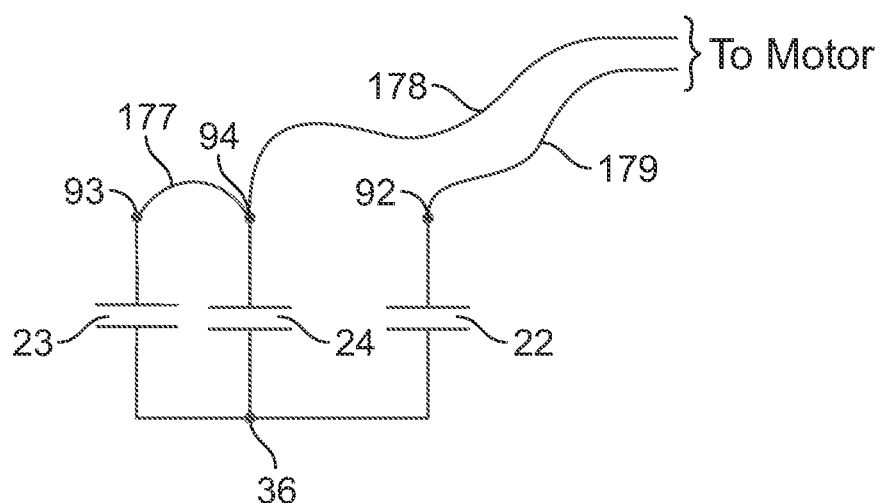
FIG. 18 is a schematic circuit diagram of the capacitor of FIG. 1 connected as shown in FIG. 17.

The connection of capacitor 10 illustrated in FIG. 17 is shown diagrammatically in FIG. 18.

FIG. 19 is a chart showing single capacitance values that can be provided by the capacitor 10 connected in parallel. The values are derived by connecting individual capacitor sections into a circuit, or by parallel connections of capacitor sections. The chart should be interpreted remembering that the 2.8 microfarad capacitor section can be used as a 2.5 or 3.0 microfarad replacement, and that the two 5.0 microfarad values are actually 4.5 and 5.5 microfarad capacitor sections, also with possibilities for more replacements.

FIGS. 20-23 are charts showing applications of capacitor 10 in replacing both a fan motor capacitor and a compressor motor capacitor. This is an important capability, because many air conditioning systems are equipped with dual value capacitors and when one of the values fails, another dual value capacitor must be substituted into the mounting space bracket.

The chart of FIG. 20 shows dual value capacitances that can be provided by capacitor 10 wherein the nominal 2.5 microfarad capacitor section 25 is used for one of the dual values, usually the fan motor. Fan motors are generally not rigid in their requirements for an exact capacitance value, wherein the capacitor section 25 may also be used for fan motors specifying a 3.0 microfarad capacitor. The remaining capacitor sections 20-24 are available for connection individually or in parallel to the compressor motor, providing capacitance values from 5.0 to 65.0 microfarads in 5.0 microfarad increments.

The chart of FIG. 21 also shows dual value capacitances that can be provided by capacitor 10. In the chart of FIG. 21, one of the dual values is 5.0 microfarads that can be provided by either capacitor section 23 having an actual capacitance value of 5.5 microfarads or by capacitor section 24 having an actual capacitance of 4.5 microfarads. As discussed above, the capacitor section 24 can also be used for a 4.0 microfarad replacement value, and capacitor section 23 could be used for a 6.0 microfarad replacement value. Thus, chart 21 represents more dual replacement values than are specifically listed. The other capacitor section may be used in various parallel connections to achieve the second of the dual capacitance values.

Chart 22 illustrates yet additional dual value capacitances that can be provided by capacitor 10. Capacitor section 25 (nominal 2.5 microfarads) is connected in parallel with one of capacitor section 23 (5.5 microfarads) or capacitor section 24 (4.5 microfarads) to provide a 7.5 microfarad capacitance value as one of the dual value capacitances. The remaining capacitor sections are used individually or in parallel to provide the second of the dual value capacitances.

Chart 23 illustrates yet additional dual value capacitances that can be provided by capacitor 10, where capacitor section 22 (10 microfarads) is dedicated to provide one of the dual values. The remaining capacitor sections are used individually or in parallel for the other of the dual values.

It will be appreciated that any one or group of capacitor sections may be used for one of a dual value, with a selected one or group of the remaining capacitor sections connected to provide another capacitance value. Although there are no known applications, it will also be appreciated that the capacitor 10 could provide six individual capacitance values corresponding to the capacitor sections, or three, four or five capacitance values in selected individual and parallel connections. Additional single values can be derived from series connections.

The six capacitor sections 20-25 can provide hundreds of replacement values, including single and dual values. It will further be appreciated that if fewer replacement values are required, the capacitor 10 can be made with five or even four capacitor sections, and that if more replacement values were desired, the capacitor 10 could be made with more than six capacitor sections. It is believed that, at least in the intended field of use for replacement of air conditioner capacitors, there should be a minimum of five capacitor sections and preferably six capacitor sections to provide an adequate number of replacement values.

As is known in the art, there are occasional failures of capacitive elements made of wound metalized polymer film. If the capacitive element fails, it may do so in a sudden and violent manner, producing heat and outgassing such that high internal pressures are developed within the housing. Pressure responsive interrupter systems have been designed to break the connection between the capacitive element and the cover terminals in response to the high internal pressure, thereby removing the capacitive element from a circuit and stopping the high heat and overpressure condition within the housing before the housing ruptures. Such pressure interrupter systems have been provided for capacitors having two and three cover terminals, including the common terminal, but it has not been known to provide a capacitor with five or more capacitor sections and a pressure interrupter cover assembly.

Figure 24:
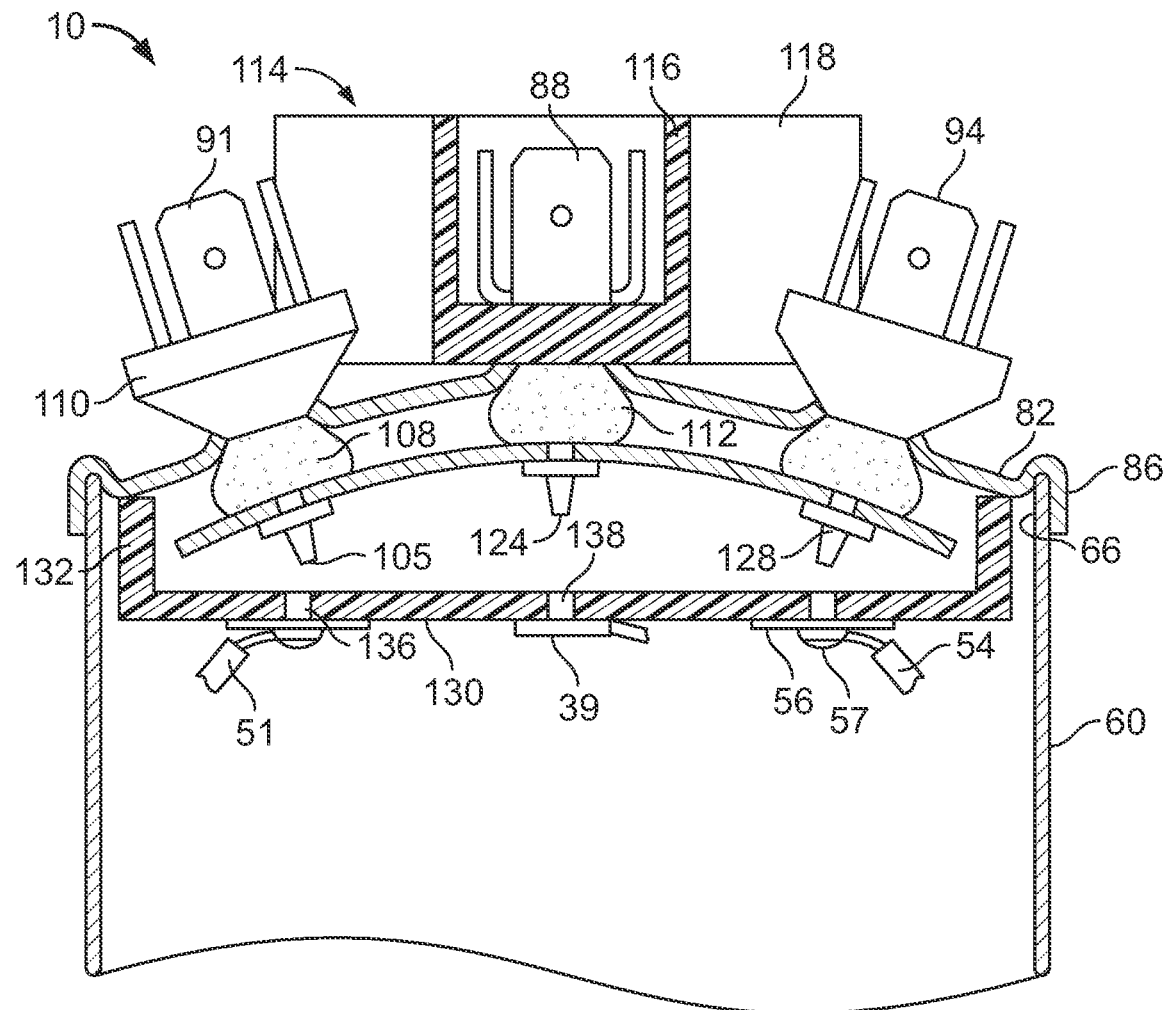
FIG. 24 is a sectional view of the capacitor of FIG. 1, taken generally along the lines 24-24 of FIG. 2, but showing the capacitor after failure of the capacitive element.

The pressure interrupter cover assembly 80 provides such protection for the capacitor 10 and its capacitive element 12. With reference to FIG. 24, the capacitor 10 is shown after failure. Outgassing has caused the circular cover 82 to deform upwardly into a generally domed shape. When the cover 82 deforms in the manner shown, the terminal posts are also displaced upwardly from the disconnect plate 130, and the weld connection of the distal end 124 of common cover terminal post 122 to the distal end 39 foil lead 38 from the common element 36 of the capacitive element 12 is broken, and the welds between the foil tabs 56 and the terminal posts 104 of the section cover terminals 90-95 are also broken, the separation at section cover terminals 91 and 94 being shown.

Although the preferred pressure interrupter cover assembly includes the foil lead 38 and foil tabs 56, frangibly connected to the distal ends of the terminal posts, the frangible connections both known in the art and to be developed may be used. As an example, the terminal posts themselves may be frangible.

It should be noted that although it is desirable that the connections of the capacitive element and all cover terminals break, it is not necessary that they all do so in order to disconnect the capacitive element 12 from a circuit. For all instances in which the capacitor 10 is used with its capacitor sections connected individually or in parallel, only the terminal post 122 of common cover terminal 88 must be disconnected in order to remove the capacitive element 12 from the circuit. Locating the cover common terminal 88 in the center of the cover 82, where the deformation of the cover 82 is the greatest, ensures that the common cover terminal connection is broken both first and with certainty in the event of a failure of the capacitive element 12.

If the capacitor sections of the capacitor 10 are utilized in a series connection, it is necessary that only one of the terminal posts used in the series connection be disconnected from its foil tab at the disconnect plate 130 to remove the capacitive element from an electrical circuit. In this regard, it should be noted that the outgassing condition will persist until the pressure interrupter cover assembly 80 deforms sufficiently to cause disconnection from the circuit, and it is believed that an incremental amount of outgassing may occur as required to cause sufficient deformation and breakage of the circuit connection at the terminal post of one of the section cover terminal. However, in the most common applications of the capacitor 10, the common cover terminal 88 will be used and the central location of the common cover terminal 88 will cause fast and certain disconnect upon any failure of the capacitive element.

Two other aspects of the design are pertinent to the performance of the pressure interrupter system. First, with respect to series connections only, the common cover terminal 88 may be twisted to pre-break the connection of the terminal post 122 with the foil strip 38, thus eliminating the requirement of any force to break that connection in the event of a failure of the capacitive element 12. The force that would otherwise be required to break the connection of common terminal post 122 is then applied to the terminal posts of the section cover terminals, whereby the section cover terminals are more readily disconnected. This makes the pressure interrupter cover assembly 80 highly responsive in a series connection configuration.

Second, the structural aspects of welding foil tabs to the distal ends of the terminal posts corresponding to the various capacitor sections and thereafter soldering the connecting wires onto the foil tabs 56 is also believed to make the pressure interrupter cover assembly 80 more responsive to failure of the capacitive element 12. In particular, the solder and wire greatly enhance the rigidity of the foil tabs 56 wherein upon deformation of the cover 82, the terminal posts break cleanly from the foil tabs 56 instead of pulling the foil tabs partially through the disconnect plate before separating. Thus, the capacitor 10, despite having a common cover terminal and section cover terminals for six capacitor sections, is able to satisfy safety requirements for fluid-filled metalized film capacitors, which is considered a substantial advance in the art.

The capacitor 10 and the features thereof described above are believed to admirably achieve the objects of the invention and to provide a practical and valuable advance in the art by facilitating efficient replacement of failed capacitors. Those skilled in the art will appreciate that the foregoing description is illustrative and that various modifications may be made without departing from the spirit and scope of the invention, which is defined in the following claims.

What is claimed is:

1. An apparatus suitable for use in an air-conditioning system and configured to provide a plurality of selectable capacitance values, the apparatus comprising:
   at least three capacitive devices, each of the at least three capacitive devices providing a capacitor having a capacitance value, each of the at least three capacitive devices having a capacitor terminal;
   a case configured to receive the at least three capacitive devices, the case having an open end;
   a cover positioned at the open end of the case, the cover comprising:
      at least three capacitor cover terminals, each of the at least three capacitor cover terminals corresponding to one of the at least three capacitors, and each of the at least three capacitor cover terminals having three contacts extending from the cover;
      at least three insulation structures, each of the at least three insulation structures configured to provide insulation for a respective one of the at least three capacitor cover terminals; and
      a common cover terminal having four contacts extending from the cover, wherein the common cover terminal is electrically connected to the at least three capacitive devices;
   at least three conductors, each of the at least three conductors configured to electrically connect the capacitor terminal of one of the at least three capacitive devices to the corresponding capacitor cover terminal; and
   a bottom cup having a post, the bottom cup positioned within the case between at least one of the at least three capacitive devices and a bottom wall of the case.

2. The apparatus of claim 1, wherein the at least three capacitive devices are each separately wound.

3. The apparatus of claim 1, wherein the at least three capacitive devices correspond to three capacitor sections of a single wound capacitive element.

4. The apparatus of claim 1, wherein the at least three capacitors provide capacitance values of about 5.0 microfarads, about 10.0 microfarads, and about 35.0 microfarads, respectively.

5. The apparatus of claim 1, wherein the insulation structures are colored.

6. The apparatus of claim 1, wherein one of the at least three capacitors provided by the at least three capacitive devices has a capacitance value of about 2.0 to 5.0 microfarads.

7. The apparatus of claim 1, wherein one of the at least three capacitors provided by the at least three capacitive devices has a capacitance value of about 5.0 to 25.0 microfarads.

8. The apparatus of claim 1, wherein one of the at least three capacitors provided by the at least three capacitive devices has a capacitance value of about 10.0 to about 70.0 microfarads.

9. The apparatus of claim 1, wherein the at least three capacitive devices are wound cylindrical capacitive devices.

10. The apparatus of claim 1, wherein the at least three capacitive devices comprise a wound dielectric film.

11. The apparatus of claim 1, wherein the post of the bottom cup is receivable by an opening of the capacitive device.

12. The apparatus of claim 1, wherein a combined capacitance value of the at least three capacitors is greater than about 40.0 microfarads.

13. The apparatus of claim 1, wherein a combined capacitance value of the at least three capacitors is greater than about 50.0 microfarads.

14. The apparatus of claim 1, wherein a combined capacitance value of the at least three capacitors is greater than about 70.0 microfarads.

15. An apparatus suitable for use in an air-conditioning system and configured to provide a plurality of selectable capacitance values, the apparatus comprising: a plurality of capacitive devices providing three capacitors, each of the three capacitors having a capacitance value, each of the plurality of capacitive devices having a capacitor terminal; a case configured to receive the plurality of capacitive devices, the case having an open end; a cover positioned at the open end of the case, the cover comprising: at least three capacitor cover terminals, each of the at least three capacitor cover terminals corresponding to one of the three capacitors, and each of the at least three capacitor cover terminals having three contacts extending from the cover; at least three insulation structures, each of the at least three insulation structures configured to provide insulation for a respective one of the at least three capacitor cover terminals; and a common cover terminal having four contacts extending from the cover, wherein the common cover terminal is electrically connected to the plurality of capacitive devices; at least three conductors, each of the at least three conductors configured to electrically connect the capacitor terminal of one of the plurality of capacitive devices to a corresponding one of the capacitor cover terminals; and a bottom cup having a post, the bottom cup positioned within the case between at least one of the plurality of capacitive devices and a bottom wall of the case, wherein the combined capacitance value of the three capacitors is greater than about 15.0 microfarads.

16. The apparatus of claim 15, wherein a first capacitor provided by the plurality of capacitive devices has a capacitance value of about 2.0 to 5.0 microfarads.

17. The apparatus of claim 15, wherein a second capacitor provided by the plurality of three capacitive devices has a capacitance value of about 5.0 to 25.0 microfarads.

18. The apparatus of claim 15, wherein a third capacitor provided by the plurality capacitive devices has a capacitance value of about 10.0 to about 70.0 microfarads.

19. The apparatus of claim 15, wherein the combined capacitance value of the three capacitors is greater than about 40.0 microfarads.

20. The apparatus of claim 15, wherein the combined capacitance value of the three capacitors is greater than about 50.0 microfarads.

21. The apparatus of claim 15, wherein the combined capacitance value of the three capacitors is greater than about 70.0 microfarads.

22. An apparatus suitable for use in an air-conditioning system and configured to provide a plurality of selectable capacitance values, the apparatus comprising: a plurality of capacitive devices providing at least three capacitors, each of the at least three capacitors having a capacitance value, each of the plurality of capacitive devices having a corresponding capacitor terminal; a case configured to receive the plurality of capacitive devices, the case having an open end; a cover positioned at the open end of the case, the cover comprising: at least three capacitor cover terminals, each of the at least three capacitor cover terminals corresponding to one of the at least three capacitors, and each of the at least three capacitor cover terminals having three contacts extending from the cover; at least three insulation structures, each of the at least three insulation structures configured to provide insulation for a respective one of the at least three capacitor cover terminals; and a common cover terminal having four contacts extending from the cover, wherein the common cover terminal is electrically connected to the plurality of capacitive devices; at least three conductors, each of the at least three conductors configured to electrically connect the capacitor terminal of one of the plurality of capacitive devices to the corresponding capacitor cover terminal; and a bottom cup having a post, the bottom cup positioned within the case between at least one of the plurality of capacitive devices and a bottom wall of the case, wherein at least one of the plurality of capacitive devices is electrically connected to a fan motor of the air-conditioning system during operation of the air-conditioning system, and wherein at least another of the plurality of capacitive devices is electrically connected to a compressor motor of the air-conditioning system during operation of the air-conditioning system, and wherein the combined capacitance value of the at least three capacitors is'greater than about 15.0 microfarads.

23. The apparatus of claim 22, wherein the combined capacitance value of the at least three capacitors is greater than about 40.0 microfarads.

24. The apparatus of claim 22, wherein the combined capacitance value of the at least three capacitors is greater than about 50.0 microfarads.

25. The apparatus of claim 22, wherein the combined capacitance value of the at least three capacitors is greater than about 70.0 microfarads.

* * * * *